(12) United States Patent
Turchette et al.

(10) Patent No.: US 7,787,505 B1
(45) Date of Patent: Aug. 31, 2010

(54) MULTI-LONGITUDINAL MODE LASER PROVIDING POLARIZATION CONTROL

(75) Inventors: Quentin A. Turchette, Boulder, CO (US); William David Lee, Westminster, CO (US)

(73) Assignee: Research Electro-Optics, Inc., Boulder, CO (US)

( * ) Notice: Subject to any disclaimer, the term of this patent is extended or adjusted under 35 U.S.C. 154(b) by 134 days.

(21) Appl. No.: 11/951,409

(22) Filed: Dec. 6, 2007

Related U.S. Application Data

(60) Provisional application No. 60/869,177, filed on Dec. 8, 2006.

(51) Int. Cl.
*H01S 3/13* (2006.01)

(52) U.S. Cl. .................. 372/29.023; 372/93; 372/99; 372/107; 372/27

(58) Field of Classification Search .......... 372/27, 372/99, 107, 29.023, 93
See application file for complete search history.

(56) References Cited

U.S. PATENT DOCUMENTS

| | | | |
|---|---|---|---|
| 4,398,293 A | | 8/1983 | Hall et al. |
| 4,451,923 A | * | 5/1984 | Hansch et al. ............ 372/32 |
| 4,649,545 A | * | 3/1987 | Lee et al. ................ 372/61 |
| 4,750,182 A | | 6/1988 | Crane et al. |
| 4,896,330 A | | 1/1990 | Krueger et al. |
| 4,922,504 A | | 5/1990 | Teva |
| 4,943,972 A | | 7/1990 | Krueger et al. |
| 5,022,034 A | | 6/1991 | May et al. |
| 5,091,913 A | | 2/1992 | Zhang et al. |
| 5,097,481 A | | 3/1992 | Fritzsche et al. |
| 5,473,626 A | * | 12/1995 | Fan et al. ................ 372/105 |
| 5,909,456 A | * | 6/1999 | Oka ....................... 372/22 |
| 6,567,456 B1 | | 5/2003 | Sandberg |
| 6,834,069 B1 | | 12/2004 | Bergmann et al. |
| 6,961,130 B2 | | 11/2005 | Law et al. |
| 2005/0213471 A1 | * | 9/2005 | Taguchi et al. ......... 369/109.02 |
| 2006/0098553 A1 | * | 5/2006 | Hirayama ............. 369/112.01 |

FOREIGN PATENT DOCUMENTS

| | | |
|---|---|---|
| WO | WO 91/00631 | 1/1991 |
| WO | WO 96/29765 | 9/1996 |

OTHER PUBLICATIONS

Allan, D.W. (Feb. 1966) "Statistics of Atomic Frequency Standards," *Proc. IEEE* 54(2):221-230.
Saleh et al. (1991) *Fundamentals of Photonics*, Wiley, New York, pp. 206-207.

* cited by examiner

*Primary Examiner*—Tod T Van Roy
(74) *Attorney, Agent, or Firm*—Greenlee Sullivan P.C.

(57) ABSTRACT

The present invention provides optical configurations, including resonant cavity and laser configurations, and related methods providing deterministic control of the polarization characteristics and frequencies of the radiant output of multi-longitudinal mode lasers, including multi-longitudinal mode gas phase lasers. Polarization control provided by the present invention includes preselection and stabilization of the angular orientations of the polarization planes of electromagnetic radiation generated by a multi-longitudinal mode laser, including preselection and stabilization of orthogonal linear polarization states generated by a dual-longitudinal mode gas phase laser.

57 Claims, 11 Drawing Sheets

MULTI-LONGITUDINAL MODE LASER PROVIDING POLARIZATION CONTROL

CROSS-REFERENCE TO RELATED APPLICATIONS

This application claims priority under 35 U.S.C. 119(e) to U.S. provisional Patent Application 60/869,177 filed Dec. 8, 2006, which is hereby incorporated by reference in its entirety.

BACKGROUND OF THE INVENTION

Gas phase lasers provide a unique combination of optical characteristics and performance attributes which make them useful optical sources for a variety of industrial and research applications. HeNe lasers, for example, are a class of gas phase laser capable of providing moderately high powers (e.g., $\approx$1-35 mW) of radiant output that varies over a narrow frequency range (e.g., on the order MHz to GHz) and exhibiting excellent beam quality (e.g., beam profile nearly ideal Gaussian $TEM_{00}$). Moreover, HeNe lasers are mechanically robust, provide highly reliable and long optical source lifetimes (e.g., 50,000-100,000 hours of use) and are capable of effective frequency stabilization, commonly without the need for integrated frequency references. HeNe lasers also provide radiant output accessing a wide range of wavelengths. Given this combination of beneficial attributes, gas phase laser optical sources, such as HeNe lasers, are widely used in diverse high performance settings, including sensing, spectroscopy, interferometry, holography and biomedical instrumentation.

Gas phase lasers typically comprise an optical resonant cavity having an integrated gas discharge tube containing a gaseous gain medium. A typical HeNe gas laser, for example, comprises a gas discharge tube enclosing a gain medium comprising a mixture of helium and neon gases. Pumping of the gain medium is commonly achieved via electrical discharge (e.g., dc, ac or rf excitation) which serves to ionize a portion of the mixture of gases initiating a complex series of electron-atom and atom-atom interactions resulting in excitation of Ne atoms of the gas mixture. An optical resonant cavity is provided such that the rate of stimulated emission exceeds the rate of spontaneous emission upon relaxation of excited Ne atoms, thereby providing optical amplification and lasing. HeNe lasers capable of providing collimated, single- or multi-longitudinal mode radiant output in the visible (e.g., 543.5 nm, 594 nm, 604 nm, 612 nm and 632.8 nm), near infrared (e.g., 1152 nm and 1523 nm) and infrared (e.g., 3392 nm) regions of the electromagnetic spectrum have been developed via appropriate selection of resonant cavity configurations including selection of the resonant cavity optical path length, reflector arrangement, and/or reflectivities of reflector optics.

Multi-longitudinal mode gas phase lasers having cavity reflectors with ion beam sputtered optical coatings provide a radiant output comprising a plurality of linearly polarized longitudinal modes having angular orientations of their polarization planes that vary as a function of time. In some dual longitudinal mode HeNe lasers, for example, two linearly polarized longitudinal modes having orthogonal linear polarization states are excited in the laser having angular orientations of their respective polarization planes that vary as a function of time. The output of these lasers, therefore, is characterized by a radiant beam comprising two orthogonal linear polarization states oscillating in polarization planes that spontaneously rotate about the propagation axis of the beam. Uncontrollable rotation of the polarization states of the radiant output of these lasers substantially hinders separation of the two longitudinal modes having orthogonal linear polarization states. This property of some multi-longitudinal mode gas phase lasers is undesirable as it prevents use of these optical sources in polarization dependent optical systems, and makes frequency stabilization of these lasers significantly more difficult. Polarization of the radiant output of gas phase lasers is described in detail in "Lasers and Electro-Optics: Fundamentals and Engineering" C. Davis, Cambridge University Press, 1996, and "Fundamentals of Photonics" Saleh and Teich, Wiley, New York, 1991 which are hereby incorporated by reference in its entirety.

Given the potential benefits of gas phase lasers in a variety of technical settings, substantial research has been directed in developing design strategies for addressing problems associated with spontaneous rotation of the polarization states of the radiant output of these optical sources. A number of these strategies involve incorporation of one or more intracavity optical elements having selected optical properties capable of providing some degree of polarization stabilization and control.

U.S. Pat. No. 6,567,456 describes a gas phase laser configuration wherein an intracavity reflector providing polarization dependent reflectivity is incorporated into the resonant cavity. The intracavity reflector is positioned such that electromagnetic radiation from one end reflector is directed to the other end reflector upon reflection from the intracavity reflector. In an embodiment, the intracavity reflector is highly reflective for s-polarized light and partially reflective for p-polarization. This optical configuration provides differential loss of p-polarized electromagnetic radiation, thereby resulting in lasing of only the s-polarization state. The radiant output of this gas phase laser configuration generates one or more longitudinal modes all linearly polarized along the same direction (e.g., s-polarized orientation). Further, deviations in the angular orientation of the polarization planes of the radiant output are minimized using this configuration. A drawback of this approach, however, is that the system does not simultaneously support multiple polarization states.

Optical resonator design strategies for providing polarization control have also been implemented using an internal Brewster window capable of providing a differential loss of a selected polarization state. Similar to the approach in U.S. Pat. No. 6,567,456, incorporation of the Brewster window prevents lasing of a selected polarization state, thereby generating radiant output comprising one or more linearly polarized longitudinal modes having the same angular orientation of their polarization planes, and exhibiting enhanced stability with respect to deviations in the angular orientation of the polarization plane. This approach is also incompatible, however, with simultaneous support of multiple polarization states.

U.S. Pat. No. 5,097,481 provides a design strategy for providing a dual-longitudinal mode gas phase laser for generating radiant output having fixed angular orientations of its polarization planes. This reference describes an alternate gas phase laser configuration wherein a birefringent element is provided in the beam path of the optical resonant cavity. The birefringent element has two preferred oscillatory planes for linearly polarized electromagnetic radiation which are oriented perpendicular to each other. In an exemplary embodiment, the birefringent element is a vapor deposited layer provided on an end reflector of the resonant cavity wherein the deposition direction is inclined by about 50 degrees through 70 degrees relative to normal incidence with respect to the end reflector surface. The birefringent layer is oriented such that laser electromagnetic radiation is incident to the birefringent layer at normal incidence. Addition of the birefringent layer is reported to result in generation of radiant output comprising two longitudinal modes having orthogonal linear polarization states with angular orientations that do not vary significantly with respect to time. A drawback of this approach, however, is that it requires use of specialized birefringent layers which add to the cost and complexity of the cavity reflectors, and may also deleteriously impact other important optical properties (e.g., reflectivity, degree of collimation/focusing, scattering etc.) of the cavity reflectors.

Another approach to providing a dual mode gas phase laser for generating radiant output with substantially fixed angular orientations of its polarization planes involves use of a resonant cavity having at least one end reflector having an electron-beam deposited coating. This resonant cavity configuration gives rise to polarization stabilization, possibly due to birefringence of the electron-beam deposited coating itself likely due to the directional nature of the structural columnar, growth of e-beam deposited films or directional control of coating stress. Electron-beam deposited coatings, however, are typically regarded as inferior to ion beam sputtered reflectors in regard to overall performance for laser cavity applications. For example, the longevity and stability with respect to externally applied mechanical stress and temperature variations of electron-beam deposited coatings is less than that of ion beam sputtered optical coatings. Also the directions of the axes of polarization of radiant output from two longitudinal mode gas phase lasers having electron-beam deposited coatings must be measured after manufacture, thereby requiring an additional preselection step.

It will be appreciated from the foregoing that multi-longitudinal mode gas phase lasers are needed capable of generating radiant output having controlled and stabilized polarization states, particularly multi-longitudinal mode gas phase lasers having resonant cavity reflectors comprising ion beam sputtered optical coatings. Multi-longitudinal mode gas phase lasers are needed that provide a radiant output comprising longitudinal modes having a plurality of preselected and well defined angular orientations of their respective polarization planes. Further, multi-longitudinal mode gas phase lasers are needed that provide polarization stabilized radiative output comprising longitudinal modes with different linear polarization states that have substantially constant angular orientations of their polarization planes as a function of time. Further, multi-longitudinal mode gas phase lasers having resonant cavity reflectors comprising ion beam sputtered optical coatings are needed that are capable of frequency stabilization.

SUMMARY OF THE INVENTION

The present invention provides optical configurations, including resonant cavity and laser configurations, and related methods providing deterministic control of the polarization characteristics and frequencies of radiant output of multi-longitudinal mode lasers. Polarization control provided by the present invention includes preselection and stabilization of the angular orientations of the polarization planes of electromagnetic radiation generated by a multi-longitudinal mode laser, including preselection and stabilization of orthogonal linear polarization states generated by a dual-longitudinal mode gas phase laser.

Control of the polarization characteristics of the radiant output of lasers is provided in the present invention by intracavity control of the relative phases of reflection of different longitudinal modes of a multi-longitudinal mode laser, for example longitudinal modes having different linear polarization states. In an embodiment, polarization control is achieved via an intracavity reflection at non-normal incidence for example using an intracavity reflector having a selected non-zero reflection phase difference between the polarization states of different laser longitudinal modes for a given incident angle of incidence. A high degree of control and stabilization of the polarization states is achieved via incorporation of an intracavity reflector comprising a thin film optical coating comprising a sequence of thin dielectric, semiconductor and/or metallic films having selected thicknesses, refractive indices and/or compositions. Polarization control methods and stabilization strategies of the present invention are compatible with implementation via resonant cavity optics and optical configurations employing reflectors, such as output coupler reflectors, high reflection reflectors and intracavity reflectors, comprising ion beam sputtered thin film optical coatings.

The present invention provides multi-longitudinal mode lasers and resonant cavity configurations for generating radiant output having preselected and stable optical characteristics, such as polarization states and frequencies, via incorporation of an intracavity reflector having a thin film optical coating providing selected reflection phase shift properties that can be precisely selected and deterministically controlled during fabrication. Some lasers of the present invention are capable of providing radiant output having polarization states and/or frequencies that are substantially constant against certain perturbing factors, such as mirror temperature and externally applied stresses. Lasers of the present invention include multi-longitudinal mode gas phase lasers providing radiant output comprising two different linearly polarized states wherein the angular orientation of the polarization plane of each polarization state is well defined and substantially constant as a function of time. The present lasers and resonant cavity configurations are also capable of providing multi-longitudinal mode radiant output wherein the angular orientations of the polarization planes of all of the longitudinal modes are preselected with respect to a reference plane or set of reference axes that can be well defined during fabrication, for example a reference plane or set of reference axes of the mechanical housing of the laser. In an embodiment, a laser of the present invention providing enhanced polarization control and stabilization comprises a resonant cavity having an intracavity reflector positioned such that laser radiation is incident at a non-normal angle of incidence, wherein the intracavity reflector comprises a sequence of thin dielectric, semiconductor and/or metallic films providing a nonzero reflection phase difference for laser longitudinal modes having different polarization states.

Multi-longitudinal mode lasers and resonant cavity configurations of this aspect of the present invention, for example, are capable of stabilizing the angular orientations of the polarization planes of two radiant longitudinal modes having different polarization states without attenuating, disrupting or altogether eliminating one of the possible polarization states of the longitudinal modes. In addition, multi-longitudinal mode gas phase lasers and resonant cavity configurations of the present invention are capable of enhanced frequency control and stabilization relative to conventional multi-longitudinal mode gas phase lasers having ion beam sputtered coated reflectors, for example by using feedback control of the optical path length of the resonant cavity based on independent measurements of the intensities of dual polarization stabilized laser longitudinal modes having stable and orthogonal linear polarization states. Furthermore, optical resonance cavity configurations of some embodiments of the present invention provide gas phase lasers, such as HeNe lasers, capable of generating polarization stabilized radiant output comprising two longitudinal modes with different linear polarization states without requiring application of an external magnetic field (i.e., magnetic field other than the earth's ambient magnetic field), or in other embodiments upon application of an external magnetic field. The present invention includes, however, multimode lasers having one or more magnets capable of generating an applied magnetic field to at least a portion of the gain medium.

In one aspect, the present invention provides a multi-longitudinal mode laser having an intracavity reflector providing intracavity control of the relative phase of reflection of longitudinal modes having different polarization states. A laser of this aspect of the invention comprises an optical resonant cavity comprising first and second end reflectors, and an intracavity reflector, all of which are provided in optical communication with each other. The intracavity reflector is positioned such that reflection by the intracavity reflector directs laser electromagnetic radiation between the first end reflector and the second end reflector. First and second end reflectors are spaced apart by a resonant cavity optical path having an optical path length selected so as to allow first and second longitudinal modes of laser electromagnetic radiation upon excitation of a gain medium provided in the optical path between the first and second end reflectors. In useful embodiments providing dual mode output with different polarization states, for example, first and second longitudinal modes of laser electromagnetic radiation have different polarization states, such as linear polarization states that are oriented orthogonal to each other. End reflectors and intracavity reflectors useful in this embodiment of the present invention include thin film optical coatings comprising a sequence of alternating high and low indices of refraction dielectric, semiconductor and/or metallic layers, for example fabricated via ion beam sputtering deposition techniques. In an embodiment, the present invention further comprises one or more magnets operationally coupled to the laser so as to generate a magnetic field in a least a portion of the gain medium.

First and second end reflectors of the laser are oriented such that the laser electromagnetic radiation is incident upon their reflective surfaces at normal incidence, and the intracavity reflector is positioned in the resonant cavity such that the laser electromagnetic radiation is incident upon its reflective surface at a non-normal angle of incidence. Intracavity polarization control and stabilization in this embodiment is provided by incorporation of an intracavity reflector providing a first reflection phase shift for the first longitudinal mode of laser electromagnetic radiation and providing a second reflection phase shift for the second longitudinal mode of laser electromagnetic radiation, wherein the first reflection phase shift is different than the second reflection phase shift. The intracavity reflector may comprise a thin film optical coating, for example, that provides different reflection phase shifts to longitudinal modes by virtue of their different polarization states. In an exemplary embodiment, for example, intracavity reflector is designed so as to provide different phase shifts for longitudinal modes having orthogonal polarization states (e.g., s- and p-polarization states).

Imparting different reflection phase shifts to different longitudinal modes via reflection by the intracavity reflector effectively fixes the angular orientation of the polarization planes of first and second longitudinal modes. Further, incorporation of an intracavity reflector providing a reflection phase difference also provides a means of selecting the angular orientations of the fixed polarization states of first and second longitudinal modes. In an embodiment, the orientation of the intracavity reflector in the resonant cavity relative to the incident laser electromagnetic radiation establishes the fixed polarization states of the radiant output. The present invention includes embodiments, for example, wherein angular orientations of the polarization states of first and second modes are deterministically defined relative to the plane of incidence of the laser electromagnetic radiation incident to the intracavity reflector. This embodiment of the present invention is useful for generating radiant output comprising first and second longitudinal modes having orthogonal linear polarization states wherein the polarization planes of each orthogonal polarization state is preselected and stable with respect to changes as a function of time.

Establishment of a selected reflection phase difference in some laser and resonant cavities of the present invention is achieved by incorporation of an intracavity reflector capable of providing a reflection phase shift response that is dependent on the polarization states of longitudinal modes established in the resonant cavity upon excitation of the gain medium. A differential phase shift response may be achieved, for example, by appropriate selection of the angle of incidence of laser electromagnetic radiation incident upon the intracavity reflector and by appropriate selection of the thin film optical coating design of the intracavity reflector. In the context of this description the thin film optical coating design of the intracavity reflector refers to the thicknesses, compositions, and/or refractive indices of dielectric, semiconductor and/or metallic layers comprising the thin film optical coating of the intracavity reflector.

The dependence of reflection phase shift on polarization state arises from the effective refractive index of polarized electromagnetic radiation incident upon a thin film layer (or series of thin film layers) which can be described for orthogonal s- and p-polarization states by the following relationships:

$$(\text{Effective Refractice Index})_{p-polarization} \propto \frac{n}{\cosine(\theta)} \quad (I)$$

$$(\text{Effective Refractice Index})_{s-polarization} \propto n(\cosine(\theta)) \quad (II)$$

wherein n is the refractive index of the material of the dielectric, semiconductor or metallic layer and $\theta$ is the angle of incidence. Accordingly, selection of the angle of incidence and the refractive indices of thin film layers of the intracavity reflector in the present lasers and resonant cavity configurations determines the reflection phase difference established upon reflection by the intracavity reflector. In an embodiment, the intracavity reflector provides a selected reflection phase difference between first and second longitudinal modes of laser electromagnetic radiation having different linear polarization states, such as orthogonal linear polarization states. For example, the intracavity reflector may provide selected reflection phase difference between first and second longitudinal modes of laser electromagnetic radiation selected from the range of about 0.1 degrees to about 20 degrees, or preferably for some embodiments selected from the range of about 0.1 degrees to about 5 degrees.

The present invention includes lasers providing a radiant output comprising two longitudinal modes of laser electromagnetic radiation having orthogonal linear polarization states, including HeNe lasers providing two longitudinal modes in the red region of the visible electromagnetic spectrum. Multi-longitudinal mode lasers of the present invention include lasers capable of providing a radiant output comprising first and second longitudinal modes having orthogonal polarization states, wherein the first and second longitudinal modes have substantially constant angular orientations of their respective orthogonal polarization planes relative to reference axes of the mechanical housing of the laser. A dual-longitudinal mode laser of the present invention provides first and second longitudinal modes corresponding to s- and p-linear polarization states with respect to the incident plane of the laser electromagnetic radiation incident to the intracavity reflector. For example, lasers of the present invention provide radiant output comprising the first longitudinal mode having a linear polarization state having a polarization plane that is oriented perpendicular to the plane of incidence of the laser electromagnetic radiation incident to the intracavity reflector and the second longitudinal mode having a linear polarization state having a polarization plane that is oriented parallel to the plane of incidence of the laser electromagnetic radiation incident to the intracavity reflector.

In addition to fixing and/or stabilizing the polarization states of radiant output, incorporation of an intracavity reflector having a non-zero reflection phase difference between first and second longitudinal modes also establishes, in part, the absolute frequency difference between these first and second modes. Accordingly, appropriate selection of the magnitude of this reflection phase difference in the present invention is useful for selectively adjusting the frequency spacing of longitudinal modes having different preselected and stable polarization states. In some embodiments, the frequency offset between first and second longitudinal modes is directly, linearly proportional to the reflection phase difference. Different domains of the absolute magnitude of the reflection phase difference provide lasers of the present invention useful for different applications. For example, selection of a small (e.g., less than 5 degrees) reflection phase difference provides lasers that can be effectively frequency stabilized.

In an embodiment, the intracavity reflector is oriented in the resonance cavity such that the laser electromagnetic radiation is incident upon the intracavity reflector at any non-normal angle of incidence, up to and including grazing incidence, and preferably for some applications at an angle of incidence less than or equal to about 15 degrees. Use of a small angle of incidence (e.g., less than 15 degrees) is desirable in some applications, such as frequency stabilized lasers, because such optical configurations facilitate achieving very small, yet non-zero, reflection phase differences. For example, it is easier to control the manufacture of intracavity reflector thin-film coatings that give very small, non-zero reflection phase differences at small angles of incidence. In addition, the reflection phase difference established using such small angles of incidence is less sensitive to small, difficult-to-eliminate variations in angle of incidence introduced during manufacture.

In an embodiment, the intracavity reflector comprises a thin film optical coating comprising a sequence of alternating high and low indices of refraction dielectric and/or semiconductor layers, wherein the thicknesses, compositions and/or refractive indices of at least a portion of the high and low indices of refraction layers in the sequence are selected and/or controlled to provide a selected reflection phase difference between the first and second longitudinal modes for a given angle of incidence. In some embodiments, for example, the thickness, refractive index or both of one or more high or low refractive index layer in the sequence proximate to the external reflective surface of the intracavity reflector is selected to provide the selected reflection phase difference between the first and second longitudinal modes for a given angle of incidence. From a thin film optical coating design and fabrication standpoint, however, selection of the thickness, composition and/or refractive index of the external-most high or low refractive index layer (i.e., layers proximate to the external reflective surface of the intracavity reflector) typically has the largest effect on the reflection phase difference achieved between longitudinal modes having orthogonal linear polarization states.

The reflectivity of the intracavity reflector is another important property of resonant cavity configurations of the present invention which can be precisely controlled via selection of the thin film optical coating design of the intracavity reflector. High reflectivity and low optical loss intracavity reflectors are particularly useful in lasers and optical resonant cavities capable of providing high powers and intensities of radiant output. In an embodiment, the intracavity reflector provides substantially the same reflectivities of the first and second longitudinal modes of laser electromagnetic radiation and/or provides reflectivities of the first and second longitudinal modes of laser electromagnetic radiation that are greater than or equal to 99%, and preferably for some applications greater than or equal to 99.9%, more preferably for some applications greater than or equal to 99.99%, and even more preferably for some applications greater than or equal to 99.999%. This combination of intracavity reflector attributes is useful for ensuring that both longitudinal modes achieve effective amplification and lasing. In some embodiments, the reflectivities of the intracavity reflector are selected such that the radiant intensities and/or powers of first and second longitudinal modes is substantially similar.

The optical path length of the resonant cavities of lasers of the present invention is another important parameter. In some embodiments, for example, the resonant cavity optical path length is selected such that only two longitudinal modes of laser electromagnetic radiation having orthogonal linear polarization states are generated upon excitation of the gain medium. The present invention includes a dual-longitudinal mode HeNe laser, for example, wherein the gain medium is a mixture of helium and neon gases and the resonant cavity optical path length is selected over the range of about 10 cm to about 30 cm. In this embodiment, the optical path length of the resonance cavity is selected such that only two longitudinal modes are within a wavelength range sufficient to support laser light generation.

Polarization control and stabilization provided by multi-longitudinal mode lasers of the present invention make them particularly well suited for frequency stabilization, for example by frequency stabilization techniques and systems not requiring an external frequency reference. Generation of longitudinal modes having orthogonal linear polarization states with substantial constant angular orientations of their respective polarization planes via lasers of the present invention allows each longitudinal mode to be efficiently separated, for example using a polarizer, and independently analyzed and detected. Separate measurements of the intensities of the longitudinal modes can serve the basis of effective feedback control of the resonance cavity optical path length, for example, thereby providing frequency stabilization.

In one embodiment, the present invention provides a frequency stabilized laser system comprising: (i) a multi-longitudinal mode laser for generating the radiant output comprising the first and second longitudinal modes of laser electromagnetic radiation having orthogonal linear polarization states, wherein the first and second longitudinal modes have angular orientations of their polarization planes that are substantially constant; (ii) an analyzer for determining a preselected photodetector signal function of the radiant power of the first longitudinal mode and the radiant power of the second longitudinal mode, the analyzer capable of providing output signals to a controller; and (iii) the controller for receiving the output signals and for selectively adjusting the resonant cavity optical path length such that the preselected photodetector signal function of the radiant power of first and second longitudinal modes is equal to a predetermined value. In one embodiment, the analyzer comprises: (i) a polarizer for spatially separating the first longitudinal mode from the second longitudinal mode; (ii) a first photodetector for measuring radiant intensities of the first longitudinal mode and generating a first photodetector output signal; (iii) a second photodetector for measuring radiant intensities of the second longitudinal mode and generating a second photodetector output signal; and (iv) a signal analyzer for receiving the first and second photodetector output signals for determining the function of the radiant power of the first longitudinal mode and the radiant power of the second longitudinal mode. The intracavity reflector optical configuration of the present invention enables multimode frequency stabilized lasers of the present invention wherein all of the resonant cavity reflectors comprise ion beam sputtered optical coatings. Means of spatially separating the first longitudinal mode from the second longitudinal mode useful in the present invention include one or more polarizers. Controllers for selectively adjusting the resonant cavity optical path length include a temperature controller operationally connected to the laser and capable of changing the temperature of the optical resonant cavity, thereby controlling the resonant cavity optical path length via thermal expansion or contraction, and include piezoelectric devices and device components for selectively adjusting the resonant cavity optical path length. Controllers useful in the present invention are capable of providing feedback control of the resonant cavity optical path length based on output signals from the analyzer so as to establish and maintain preselected values for the function of the radiant intensities of the first and second longitudinal modes.

In another aspect, the present invention provides a reflector assembly for a multi-longitudinal mode laser comprising: a first end reflector; a second end reflector and an intracavity reflector. First and second end reflectors are positioned in optical communication and are spaced apart by a resonant cavity optical path having an optical path length selected so as to allow first and second longitudinal modes of laser electromagnetic radiation upon excitation of a gain medium provided in the resonant cavity optical path between the first and second end reflectors. Longitudinal modes generated by resonant cavities of the present invention may have different polarizations states, for example orthogonal linear polarization states. Useful end reflector pairs include an output coupler reflector and a high reflectivity reflector. The intracavity reflector is positioned in the resonant cavity such that the laser electromagnetic radiation is incident upon the intracavity reflector at a non-normal angle of incidence, and reflection by the intracavity reflector provides a first reflection phase shift for the first longitudinal mode of laser electromagnetic radiation and provides a second reflection phase shift for the second longitudinal mode of laser electromagnetic radiation, wherein the first reflection phase shift is different than the second reflection phase shift. In an embodiment of this aspect, the first end reflector is an output coupler reflector and the second end reflector is a high reflectivity reflector provided such that the laser electromagnetic radiation is incident upon the output coupler reflector and high reflectivity reflector at normal incidence. In an embodiment of this aspect, the first longitudinal mode has a linear polarization state having a polarization plane that is oriented perpendicular to the plane of incidence of the laser electromagnetic radiation incident to the intracavity reflector, and wherein the second longitudinal mode has a linear polarization state having a polarization plane that is oriented parallel to the plane of incidence of the laser electromagnetic radiation incident to the intracavity reflector. In an embodiment, the intracavity reflector provides a reflection phase difference between the first and second longitudinal modes of laser electromagnetic radiation selected from the range of about 0.1 degrees to about 20 degrees. In an embodiment, the intracavity reflector, first end reflector and second end reflector each comprise a thin film optical coating deposited on a substrate via ion beam sputtering.

In another aspect, the present invention provides a method for controlling the angular orientations of the polarization planes of radiant output of a multi-longitudinal mode laser comprising the steps of: (i) providing an optical resonant cavity comprising first and second end reflectors provided in optical communication with each other, wherein the first and second reflectors are spaced apart by a resonant cavity optical path length selected so as to allow first and second longitudinal modes of laser electromagnetic radiation having different polarization states, optionally having orthogonal linear polarization states, upon excitation of a gain medium provided between the first and second end reflectors; and (ii) providing an intracavity reflection of the laser electromagnetic radiation at non-normal incidence, the intracavity reflection providing a first reflection phase shift for the first longitudinal mode of laser electromagnetic radiation and providing a second reflection phase shift for the second longitudinal mode of laser electromagnetic radiation, wherein the first phase shift is different than the second reflection phase shift; thereby controlling angular orientations of the polarization planes of radiant output of the frequency stabilized multi-longitudinal mode laser. In an embodiment, the step of providing an intracavity reflection comprises providing an intracavity reflector positioned in the resonant cavity such that the laser electromagnetic radiation is incident upon the intracavity reflector at a non-normal angle of incidence; wherein the intracavity reflector provides a selected reflection phase difference between the first and second longitudinal modes of laser electromagnetic radiation having orthogonal linear polarization states. In an embodiment, the intracavity reflection is provided at an angle of incidence providing a selected reflection phase difference between the first and second longitudinal modes. In an embodiment, the first and second longitudinal modes have different polarization states, for example wherein first and second longitudinal modes are orthogonal linear polarization states. A method of this embodiment further comprises the step of providing one or more magnets positioned so as to generate an applied magnetic field to at least a portion of the gain medium.

In a method of this embodiment, the first longitudinal mode has a linear polarization state having a polarization plane that is oriented perpendicular to the plane of incidence of the laser electromagnetic radiation incident to the intracavity reflector, and wherein the second longitudinal mode has a linear polarization state having a polarization plane that is oriented parallel to the plane of incidence of the laser electromagnetic radiation incident to the intracavity reflector.

In a method of this embodiment, the step of providing an intracavity reflection comprises providing an intracavity reflector positioned in the resonant cavity such that the laser electromagnetic radiation is incident upon the intracavity reflector at a non-normal angle of incidence; wherein the intracavity reflector provides a selected reflection phase difference between the first and second longitudinal modes of laser electromagnetic radiation. In a method of this embodiment, the intracavity reflection is provided at an angle of incidence providing a selected reflection phase difference between the first and second longitudinal modes. In a method of this embodiment, the selected reflection phase difference between the first and second longitudinal modes of laser electromagnetic radiation is selected from the range of about 0.1 degrees to about 20 degrees. In a method of this embodiment, the intracavity reflection is provided at a non-normal angle of incidence less than or equal to about 15 degrees. In a method of this embodiment, the intracavity reflection provides substantially the same reflectivity for the first and second longitudinal modes of laser electromagnetic radiation; wherein the first and second longitudinal modes of laser electromagnetic radiation have orthogonal linear polarization states.

In a method of this embodiment, the radiant output of the multi-longitudinal mode laser comprises the first and second longitudinal modes having different linear polarization states, the first and second longitudinal modes having angular orientations of their polarization planes that are substantially constant. In a method of this embodiment, the radiant output of the multi-longitudinal mode laser comprises the first and second longitudinal modes having orthogonal linear polarization states. In a method of this embodiment, the first and second longitudinal modes of laser electromagnetic radiation correspond to s- and p-linear polarization states with respect to an incident plane of the laser electromagnetic radiation incident to an intracavity reflector provided in the resonant cavity.

In another aspect, the present invention provides a method of frequency stabilizing the radiant output of a multi-longitudinal mode laser comprising the steps of: (i) providing the multi-longitudinal mode laser of the present invention, wherein the multi-longitudinal mode laser generates the radiant output comprising the first and second longitudinal modes of laser electromagnetic radiation having orthogonal linear polarization states, wherein the first and second longitudinal modes have angular orientations of their polarization planes that are substantially constant; (ii) separating the first longitudinal mode from the second longitudinal mode; (iii) measuring radiant powers of the first longitudinal mode; (iv) measuring radiant powers of the second longitudinal mode; and (v) controlling the resonant cavity optical path length such that a preselected photodetector signal function of the radiant powers of the first and second longitudinal modes is equal to a predetermined value. In an embodiment of this aspect, the step of separating the first longitudinal mode from the second longitudinal mode is carried out by directing the radiant output of the multi-longitudinal mode laser through one or more polarizers. In an embodiment of this aspect, the step of controlling the resonant cavity optical path length is carried out by changing the temperature of the resonant cavity so as to establish and maintain the preselected photodetector signal function of the radiant powers of the first and second longitudinal modes equal to the predetermined value. In an embodiment of this aspect, the step of controlling the resonant cavity optical path length is carried out by using a piezoelectric element operationally coupled to the multi-longitudinal mode laser capable of selectively adjusting the resonant cavity optical path length so as to establish and maintain the preselected photodetector signal function of the radiant powers of the first and second longitudinal modes equal to the predetermined value. In an embodiment of this aspect, the preselected photodetector signal function is the difference between the first and second radiant powers or the ratio of the first and second radiant powers. In an embodiment of this aspect, the intracavity reflector is oriented in the resonance cavity such that the laser electromagnetic radiation is incident upon the intracavity reflector at a non-normal angle of incidence less than or equal to grazing incidence. In an embodiment of this aspect, intracavity reflection is provided at a non-normal angle of incidence less than or equal to grazing incidence.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

In FIG. 6, frequency offset is measured with respect to an iodine stabilized laser.

DETAILED DESCRIPTION OF THE INVENTION

Figure 1:
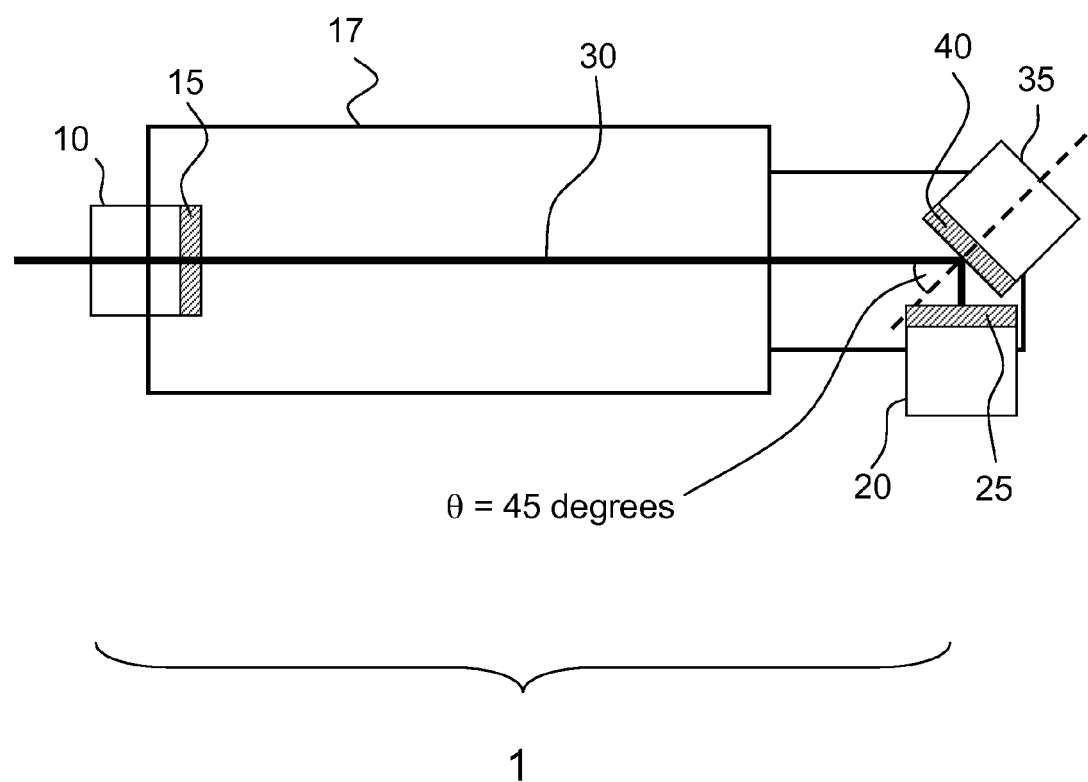
FIG. 1 provides a schematic diagram of a dual-longitudinal mode gas phase laser of the present invention providing enhanced polarization control and stabilization.

Referring to the drawings, like numerals indicate like elements and the same number appearing in more than one drawing refers to the same element. In addition, hereinafter, the following definitions apply:

The term "electromagnetic radiation" and "light" are used synonymously in the present description and refer to waves of electric and magnetic fields. Electromagnetic radiation useful for the methods of the present invention include, but is not limited to ultraviolet light, visible light, infrared light, or any combination of these having wavelengths between about 100 nanometers to about 15 microns.

"Thin film optical coating" refers to one or more thin dielectric layers, thin semiconductor layers and/or thin metallic layers that provide desired optical properties, such as high reflectivity with low optical loss. Thin film optical coatings useful in the present invention include sequences of thin dielectric, semiconductor and/or metal layers exhibiting reflectivity, including high reflectivity, and optionally generate a differential phase shift for electromagnetic radiation having different polarization states. For example, the present invention includes optical configurations having an intracavity reflector comprising a thin film optical coating that provides a selected phase difference between different longitudinal modes upon reflection. Thin film optical coatings may be supported by a variety of substrate materials including quartz substrates, silicon substrates, glass substrates, dielectric substrates, ceramic substrates, polymer substrates and substrates comprising low thermal expansion materials (e.g., Zerodur, Invar etc.).

"Thin dielectric layer", "thin semiconductor layer", and/or "thin metallic layer" refer to a thin film layers comprising a coating of atoms, molecules or mixtures thereof. Dielectric, semiconductor and/or metallic layers useable in the present invention may comprise a single-layer or a plurality of thin layers. Thin layers useable in the present invention may have either a homogeneous composition or a heterogeneous composition and may comprise a single phase or a plurality of phases. Reference to dielectric layers in the present invention includes, but is not limited to, metal oxide thin films. Metal oxides useable in the present invention include but are not limited to silica, $Ta_2O_5$, $SiO_2$, $HfO_2$, $TiO_2$, $MgF_2$, $CaF_2$, $Nb_2O_5$, glass or mixtures of these metal oxides. Reference to semiconductor layers in the present invention includes, but is not limited to, silicon, such as silicon, germanium, and compound semiconductors. Dielectric, semiconductor and/or metallic thin film layers of the present invention may be any size, shape, thickness or optical thickness useful for a selected application. Thickness of thin film may be defined absolutely or relative to the center resonance frequency of either reflector. For example, thin film layers are commonly referred to as ¼ and ½ layers indicating an optical thickness approximately equal to the indicated fraction of the wavelength of light [in the material comprising the layer] corresponding to the center resonance frequency of the reflectors comprising the filter. Thin film layers of the present invention include ¼ and ½ layers and layers having thicknesses that deviate from ¼ and ½ layers. For example, dielectric layers of the present invention may have optical thicknesses that are less than or greater than ¼ wave layers. Preferred absolute thickness ranges from 5 nm-5000 nm. More preferred absolute thickness range from 25 nm to 1500 nm.

"Optical thickness" and "optical path length" refer to the effective path length of light that takes into consideration the refractive index of the material light is propagating through. Analytically, optical thickness and optical path length terms may be expressed in the following summation as the product of physical thickness and the refractive index of a layer or plurality of layers:

$$\text{optical thickness} = \text{optical path length} = \sum_i n_i \times L_i,$$

where $L_i$ is the physical thickness of layer i and n is the refractive index of the material of layer i.

The terms "reflector" and "mirror" are used synonymously in the present description and refer generally to surfaces, device components and materials exhibiting reflectivity. Reflectors of the present invention include partially reflective reflectors, such as output coupler reflectors, that reflect a portion of incident electromagnetic radiation. Reflectors of the present invention also include high reflectivity reflectors that reflect substantially all incident electromagnetic radiation, for example, in some embodiments high reflectivity reflectors reflect greater than 99.0% of incident electromagnetic radiation; in some embodiments high reflectivity reflectors reflect greater than 99.9% of incident electromagnetic radiation, in some embodiments high reflectivity reflectors reflect greater than 99.99% of incident electromagnetic radiation and in some embodiments high reflectivity reflectors reflect greater than 99.999% of incident electromagnetic radiation. Reflectors of the present invention include, but are not limited to, multilayer thin film optical coatings. In some embodiments, for example, an end reflector and/or an intracavity reflector of the present invention comprises a sequence of thin dielectric layers, semiconductor layers and/or thin metallic layers, wherein the sequence alternates between high and low index of refraction layers. Use of reflectors comprising thin dielectric layers is beneficial for gas phase HeNe lasers of the present invention because they are capable of providing very little radiant loss. Reflectors of this aspect of the present invention include sequences of thin dielectric layers and/or semiconductor layers comprising quarter wave stacks of alternating high and low refractive indices thin film layers. Reflectors of the present invention also include thin film optical coatings wherein at least one of the dielectric, semiconductor and/or metallic layers in the sequence has a thickness that deviates from quarter wave thickness. The terms "high" and "low" indices of refraction are defined relative to one another. Accordingly, a "high" index of refraction is larger than a "low" index of refraction and a "low" index of refraction is smaller than a "high" index of refraction. Multilayer thin film optical coatings of reflectors of the present invention may be provided on an appropriate substrate. Reflectors having substantially the same reflectivities for electromagnetic radiation having different polarization states, such as electromagnetic radiation having orthogonal linear polarization states, exhibit reflectivities for both polarization states that are with about 1% of each other, preferably for some embodiments reflectivities for both polarization states that are with about 0.1% of each other and more preferably for some embodiments reflectivities for both polarization states that are with about 0.01% of each other.

"Reflection phase shift" refers to the change in phase in an incidence beam of electromagnetic radiation upon reflection from a reflector or other reflective surface. Reflection phase shift may depend on a number of variables including: (i) the polarization state of the incident electromagnetic radiation, (ii) the angle of incidence of incident electromagnetic radiation on a reflector or other reflective surface, (iii) the refractive index of a thin film layer(s) that the reflected electromagnetic radiation is incident upon, and (iv) the physical thickness that the reflected electromagnetic radiation is incident upon. "Reflection phase difference" refers to the difference between phase shifts experienced upon reflection by different polarization states. In an embodiment, reflection phase difference refers to the difference between phase shifts experienced upon reflection of electromagnetic radiation having orthogonal linear polarization states, such as the difference between phase shifts experienced upon reflection of electromagnetic radiation having the linear polarizations parallel (p) and perpendicular (s) to the plane of incidence. (refer to FIGS. 9A and 9B).

"Gain medium" refers to a material that is excited so as to provide a means to generate electromagnetic radiation for optical amplification and lasing. A gain medium is a component of a laser system. Gain medium useful in gas phase lasers of the present invention include, but are not limited to, one or more of the following gases; helium, neon, iodine, krypton, argon, xenon, nitrogen, and carbon dioxide.

A "substantially constant angular orientation of the polarization plane" is a characteristic of electromagnetic radiation generated by lasers of the present invention. In an embodiment, a laser of the present invention generates at least two longitudinal modes of electromagnetic radiation having substantially constant angular orientations of their respective polarization planes, wherein variations of the angular orientations of the respective polarization planes are less than lasers having cavity reflectors comprising ion beam sputtered optical coatings without having an intracavity reflector.

"Optical communication" refers to a configuration of two or more elements wherein one or more beams of electromagnetic radiation are capable of propagating from one element to the other element. Elements in optical communication may be in direct optical communication or indirect optical communication. "Direct optical communication" refers to a configuration of two or more elements wherein one or more beams of electromagnetic radiation propagate directly from a first device element to another without use of optical components for steering and/or combining the beams. "Indirect optical communication" on the other hand refers to a configuration of two or more elements wherein one or more beams of electromagnetic radiation propagate between two elements via one or more device components including, but not limited to, wave guides, fiber optic elements, reflectors, filters, prisms, lenses, gratings and any combination of these device components.

"Beam of electromagnetic radiation" refers to electromagnetic radiation propagating in substantially the same direction (e.g., beam divergence less than 5 degrees). In the present description, use of the term beam of electromagnetic radiation is intended to be consistent with use of this term in the art of optics, opto-electronics and spectroscopy. Beams of electromagnetic radiation useful in the methods of the present invention include coherent beams of electromagnetic radiation, pulses of electromagnetic radiation and continuous wave beams of electromagnetic radiation. Beams of electromagnetic radiation useful in the present methods may be focusing, diverging, collimated, partially collimated or uncollimated.

The expression "polarization control" relates to the ability of lasers of the present invention to provide radiant output having selected polarization characteristics, optionally that are deterministically preselected during fabrication. In an embodiment, for example, polarization control refers to the ability of lasers of the present invention to provide radiant output having accurately preselected angular orientations of its polarization planes. Some lasers of this aspect of the present invention provide radiant output having angular orientations of its polarization planes that are deterministically defined during fabrication relative to one or more reference axes or reference planes, for example one or more reference axes or reference planes of the laser housing. In some embodiments, deterministic control of the angular orientations of the polarization planes of radiant output is achieved by selection of the rotational orientation of the intracavity reflector having a nonzero reflection phase difference between different longitudinal modes, for example via rotation of the intracavity reflector about the axis of beam propagation. In embodiments of the present invention, polarization control may also refer to the ability of laser of the present invention to provide radiant output having stable and/or substantially constant angular orientations of their polarization planes. In this aspect of the present invention, angular orientations of the polarization planes of radiant output are substantially constant with respect to time and a mechanic reference. In the present invention, deviations in substantially constant angular orientations of polarization planes typically result from system changes such as non uniform thermal expansion or contraction of elements of the laser; variations in the temperature of the reflectors or mirror mounts, and/or mechanical vibration, applied mechanical strain and/or applied mechanical stress of elements of the laser.

Plane of incidence refers to the plane defined by the incident light path and the reflected light path.

Figure 9:
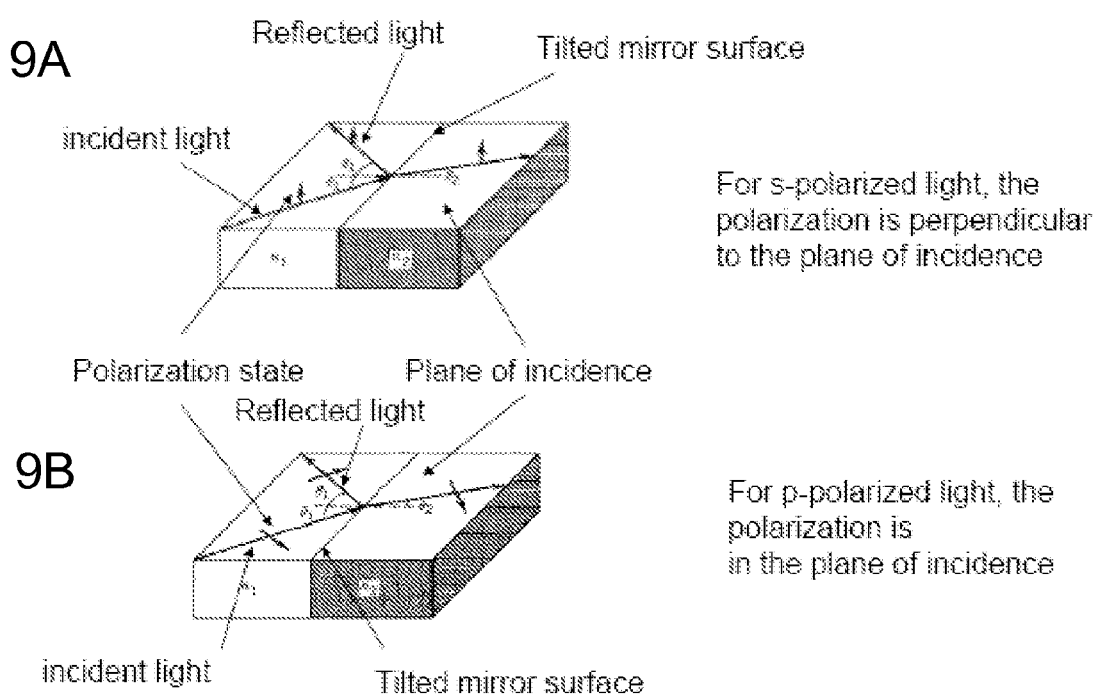
FIGS. 9A and 9B provides a schematic diagram of s- and p-polarization states of electromagnetic radiation incident to a reflective surface at a non-normal angle of incidence. A portion of this diagram was taken from Saleh and Teich, "Fundamentals of Photonics." Wiley, New York, 1991, pp 206-7, which is hereby incorporated by reference in its entirety.

FIG. 9A shows an exemplary beam of electromagnetic radiation having a s-polarization state incident on a reflector surface at a non-normal angle of incidence and FIG. 9B shows an exemplary beam of electromagnetic radiation having a p-polarization state incident on a reflector surface at a non-normal angle of incidence. The polarization plane is defined by the polarization (electric field) vector (shown as the short arrows in FIG. 9) and the incident beam. If the incident light is s-polarized, the plane of polarization is perpendicular to the plane of incidence, if the incident light is p-polarized, the plane of polarization is in to the plane of incidence. Polarization control means that the plane of polarization remains substantially constant in time and in space relative to the plane of incidence. As shown in these figures, the polarization state of a beam incident to a reflector is defined relative to the plane of incidence. All polarizations can be broken into a component that is in the plane of incidence (p, or transverse magnetic, TM) and a component that is perpendicular to the plane of incidence (s, or transverse electric, TE).

The polarization plane is defined by the polarization (electric field) vector (shown as the short arrows in FIG. 9) and the incident beam. If the incident light is s-polarized, the plane of polarization is perpendicular to the plane of incidence, if the incident light is p-polarized, the plane of polarization is in to the plane of incidence. Polarization control means that the plane of polarization remains substantially constant in time and in space relative to the plane of incidence.

In the following description, numerous specific details of the devices, device components and methods of the present invention are set forth in order to provide a thorough explanation of the precise nature of the invention. It will be apparent, however, to those of skill in the art that the invention can be practiced without these specific details. Reference in the specification to "a preferred embodiment," "a more preferred embodiment" or "an exemplary embodiment" means that a particular feature, structure, or characteristic set forth or described in connection with the embodiment is included in at least one embodiment of the invention. Reference to "preferred embodiment," "a more preferred embodiment" or "an exemplary embodiment" in various places in the specification do not necessarily refer to the same embodiment.

Not wanting to be bound to any particular theory, the description provided herein, including a theoretical and mechanistic description of lasers of the present invention, is intended to enhance teaching of how to make and use the present invention.

Polarization control of a HeNe laser tube commonly uses differential intensity loss for different polarization states to generate a single-polarization tube providing radiant output having a single linear polarization state. For example, an internal Brewster window induces sufficient loss in one polarization state that only the low-loss, orthogonal polarization state lases. The same is true for the polarization scheme in U.S. Pat. No. 6,567,456 (Jon C. Sandberg, "Method and apparatus for achieving polarization in a laser using a dual-reflector mount"). In that patent, differential polarization loss provided by a non-normal incidence reflector is used to control polarization a HeNe tube.

The present invention provides multi-longitudinal mode lasers, including dual-longitudinal mode gas phase lasers, capable of providing radiant output comprising a plurality of longitudinal modes having different polarization states, wherein the angular orientations of the polarization planes for each polarization state is preselected and substantially constant with respect to time. In an embodiment, the present invention provides a red HeNe laser capable of generating two longitudinal modes having orthogonal linear polarization states wherein the angular orientations of the polarization planes of each orthogonal polarization state is preselected and fixed relative to one or more reference axes and/or a reference plane of the laser housing. Polarization stabilization of the present multi-longitudinal mode gas phase lasers allows for enhanced frequency stabilization relative to multi-longitudinal mode gas phase lasers having resonant cavity reflectors comprising ion beam sputtered optical coatings not having an intracavity reflector.

In an embodiment, a two longitudinal mode polarization frequency stabilization technique for HeNe lasers is configured as follows. The length of the laser cavity is selected such that there are two and only two longitudinal modes under the gain curve. For a red HeNe laser this is satisfied at a length of about 12 cm, where the free spectral range (FSR) is about equal to the full width of the laser gain profile, 1.2 GHz. In this embodiment, the two longitudinal modes generated are in orthogonal linear polarization states. This characteristic is attractive for frequency stabilization applications because the two longitudinal modes are easily spatially separated with a polarizer, and, hence effectively detected independently. One polarization is detected at one detector and the orthogonal polarization is detected at another detector. Some function of the powers detected by the detectors is established and controlled by manipulating the laser cavity optical path length, for example using controlled thermal expansion or contraction, using piezoelectric control elements and/or by variation of the discharge current. Meeting this condition ensures that the two longitudinal modes are fixed in frequency relative to the gain curve. Since the gain curve is a stable property of the Ne atoms contributing to the laser transition, the frequency of the laser can be effectively fixed and stabilized. One or both polarization states may be chosen as the output depending on the application.

In the two longitudinal mode method, the polarization optics and detectors are fixed in space relative to the mechanical housing of the laser. Therefore, the polarization axis of the laser should also be fixed and stable with respect to the laser housing. This condition is sometimes satisfied by resonant cavity configurations having at least one optic whose coating is electron-beam (e-beam) deposited, and less likely to be satisfied by resonant cavity configurations using only Ion-Beam-Sputtered (IBS) optics. In tubes using all-IBS coated optics, the polarization states of the longitudinal modes tends to have no preferred axis and, thus the angular orientations of the polarization planes of the longitudinal modes rotates rapidly about the propagation axis of the beam. This limitation of conventional resonant cavity configurations for gas phase lasers is problematic with respect to their frequency stabilization as it results in unstable signals to the detectors.

The property of the e-beam coated optics that leads to polarization pinning is a birefringence of the coating. This effect may be due to the directional nature of the structural, columnar growth of the e-beam deposited film, which gives the reflector an effective preferred axis or directionally controlled stress.

IBS reflectors are desirable for gas phase laser resonant cavity configurations due to their durability and extremely low optical loss. IBS reflectors exhibit no measurable birefringence, however, and therefore HeNe lasers having reflectors comprising ion beam sputtered optical coatings have been previously considered unsuitable for frequency stabilization. The present invention provides HeNe laser resonant cavity configurations capable of providing the polarization stabilization necessary to achieve effective frequency stabilization by introducing an intracavity reflection at non-normal incidence. In these cavity configurations, the design of the coating of the non-normal-incidence intracavity reflector provides a known, controllable reflection phase difference between the two orthogonal polarization components. In an embodiment, the two orthogonal polarization components are s- and p-polarized with respect to the plane of incidence of laser electromagnetic radiation incident on the non-normal incidence reflector. This accomplishes two things: The axis of polarization of the radiant output is fixed, like normal-incidence e-beam tubes, and the angular orientation of the polarization plane is known at manufacture, which is often not true of HeNe lasers designs employing e-beam coated optics. Knowledge of the polarization axes at manufacture eliminates mechanical alignment steps that are needed for tubes with unknown polarization axis orientation. Additionally, rather than relying on a property of the coating that is difficult to control, the reflection phase difference provided by reflection from the intracavity reflector is part of the coating design, such as provided by selection of the physical thicknesses, refractive indices, and/or compositions of thin films in an optical coating comprising the intracavity reflector.

Polarization control is achieved in some embodiments by providing: (i) a coating that has no birefringence at normal incidence for two of the laser reflectors, and (ii) a controlled, non-zero reflection phase difference between different longitudinal modes at non-normal angles for a third reflector. In this embodiment, the design and incorporation of the intracavity reflector having a reflection phase difference between different longitudinal modes provides for polarization control. In some embodiments useful for providing a frequency stabilized laser the reflection phase difference of the intracavity reflector has a small, controlled, reliable value.

FIG. 1 provides a schematic diagram of a dual-longitudinal mode gas phase laser of the present invention providing enhanced polarization control and stabilization. The present dual-longitudinal mode laser is capable of generating radiant output comprising two longitudinal modes having orthogonal linear polarization states, wherein the orientation of the polarization planes of both polarization states is preselected relative to reference axes and is stable with respect to time. As shown in FIG. 1, dual-longitudinal mode laser 1 comprises an optical resonant cavity comprising first end reflector 10 and second end reflector 20 provided in optical communication with each other. In the embodiment illustrated in FIG. 1, first end reflector 10 and second end reflector 20 are provided in laser housing 17. In an embodiment, first end reflector 10 corresponds to the sealed output coupler of laser 1 and comprises thin film optical coating 15, and second end reflector 20 corresponds to the sealed high reflectivity reflector of laser 1 and comprises thin film optical coating 25. Thin film optical coatings 25 and 15 comprise sequences of dielectric and/or semiconductor layers, such as sequences of alternating high and low refractive index dielectric and/or semiconductor layers. The thicknesses and refractive indices of layers in the sequence are selected to provide appropriate reflectivities for these resonant cavity components. In an embodiment, thin film optical coating 15 comprises a sequence of alternating high and low refractive index dielectric and/or semiconductor layers having approximately (e.g., within about 10%) quarter wave thicknesses and providing reflectivity greater than about 98%, and thin film optical coating 25 comprises a sequence of alternating high and low refractive index dielectric and/or semiconductor layers having approximately (e.g., within about 10%) quarter wave thicknesses and providing reflectivity greater than about 99%, preferably for some applications greater than about 99.9%, more preferably for some applications greater than about 99.99% and even more preferably for some applications greater than about 99.999%

First end reflector 10 and second end reflector 20 are spaced apart by a resonant cavity optical path having an optical path length selected so as to allow first and second longitudinal modes of laser electromagnetic radiation 30 upon excitation of a gain medium provided in the resonant cavity optical path between the first and second end reflectors. First and second longitudinal modes are linearly polarized and have polarization planes orthogonal to each other. For the sake of clarity, laser electromagnetic radiation is schematically represented as line 30 in FIG. 1. First end reflector 10 and second end reflector 20 are positioned such that laser electromagnetic radiation 30 is incident on their reflective surfaces (i.e., thin film optical coatings 15 and 25) at normal incidence.

Laser 1 further comprises intracavity reflector 35 positioned in the resonant cavity such that the laser electromagnetic radiation 30 is incident upon the intracavity reflector at a non-normal angle of incidence. In the optical configuration shown in FIG. 1 the intracavity reflector 35 is positioned such that laser electromagnetic radiation 30 is incident upon the intracavity reflector 35 at an angle of incidence equal to 45 degrees. As shown, reflection by the intracavity reflector 35 directs laser electromagnetic radiation 30 between the first end reflector 10 and the second end reflector 20. Intracavity reflector 35 comprises thin film optical coating 40 providing a first reflection phase shift for the first longitudinal mode of laser electromagnetic radiation and providing a second reflection phase shift for the second longitudinal mode of laser electromagnetic radiation, wherein the first reflection phase shift is different than the second reflection phase shift. In an embodiment, thin film optical coating 40 comprises a sequence of thin dielectric and/or semiconductor films, for example a sequence of alternating high and low index of refraction thin dielectric and/or semiconductor films, providing a selected, nonzero reflection phase difference between said first and second longitudinal modes of laser electromagnetic radiation 30 for a given angle of incidence, for example a reflection phase difference selected over the range of about 0.1 degrees and about 20 degrees. The present invention includes intracavity thin film optical coatings 40 having a sequence of thin films wherein the appropriate reflection phase difference is generated by virtue of first and second longitudinal modes having different polarization states, such as linearly polarized states having orthogonal polarization planes. In these embodiments, intracavity thin film optical coating 40 comprises a sequence of thin films having physical thickness, refractive indices and compositions selected such that upon reflection the reflector provides a different phase shift for different polarization states.

Intracavity reflector 35 is also highly reflective and exhibits low optical losses, for example providing reflectivities for first and second orthogonal longitudinal modes greater than or equal to 99.9%, preferably for some embodiments greater than or equal to 99.99%. In an embodiment, intracavity reflector 35 provides substantially the same reflectivities for first and second orthogonal longitudinal modes. Use of a high reflectivity and low optical loss intracavity reflector 35 is useful for achieving lasing and generating radiant output having sufficiently high intensity and/or power for a given application.

Incorporation of intracavity reflector 35 providing a non-zero reflection phase shift fixes the angular orientations of the polarization planes of the first and second longitudinal modes of laser electromagnetic radiation 30 having orthogonal linear polarization states. Accordingly, the polarization axes of the laser is fixed in space relative to the laser tube housing 17 using this optical configuration. Further, first and second longitudinal modes, in these embodiments, correspond to s- and p-linear polarization states with respect to the incident plane of the laser electromagnetic radiation incident to the intracavity reflector.

Figure 2:
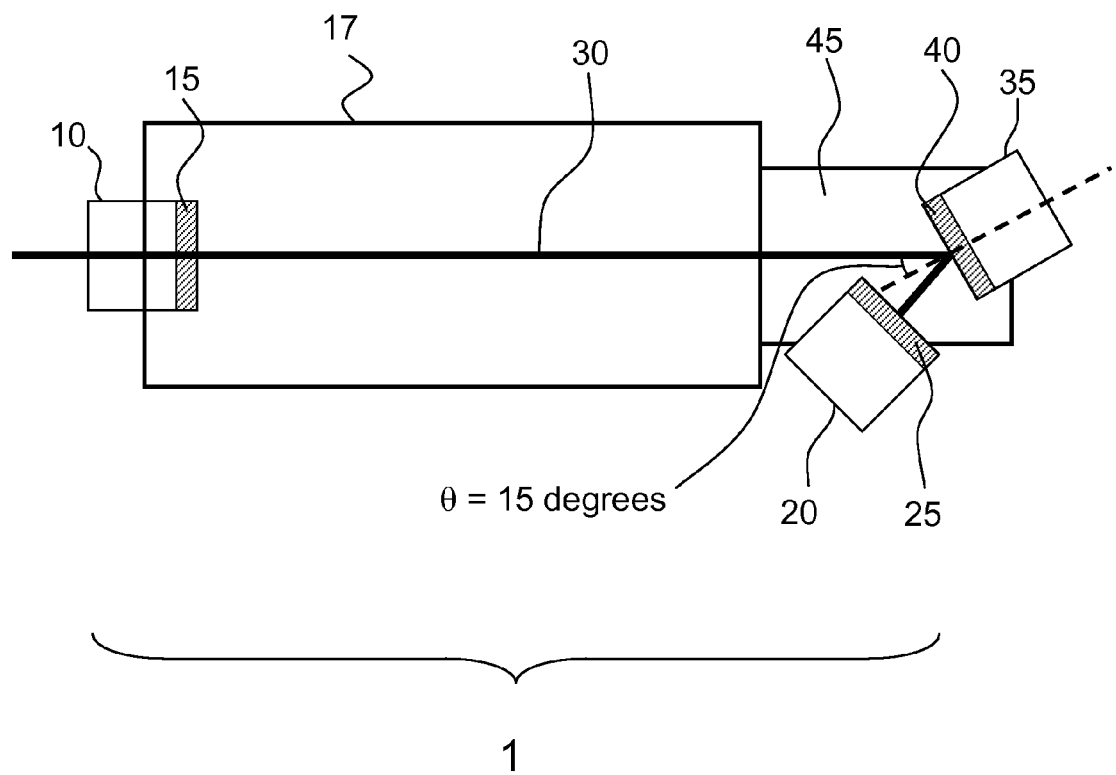
FIG. 2 provides a schematic diagram of a dual-longitudinal mode gas phase laser of the present invention having an alternate optical geometry, wherein laser electromagnetic radiation is incident upon the intracavity reflector at an angle of incidence equal to 15 degrees.

FIG. 2 provides a schematic diagram of a dual-longitudinal mode gas phase laser of the present invention having an alternate optical geometry, wherein laser electromagnetic radiation 30 is incident upon the intracavity reflector 35 at an angle of incidence equal to 15 degrees. FIG. 2 illustrates that any non-normal angle of incidence with respect to the positioning of intracavity reflector 35 can be used in the present invention. Use of a smaller angle of incidence (for example as shown in FIG. 2), however, is desirable for some applications. For example, it is easier to achieve small, non-zero reflection phase difference using a small angle of incidence. In addition, it is easier to control the manufacture of the thin-film coatings that give small reflection phase difference using a small angle of incidence. Further, the reflection phase difference is less sensitive to small, difficult-to-eliminate variations in angle of incidence when a small angle of incidence is employed.

Figure 3:
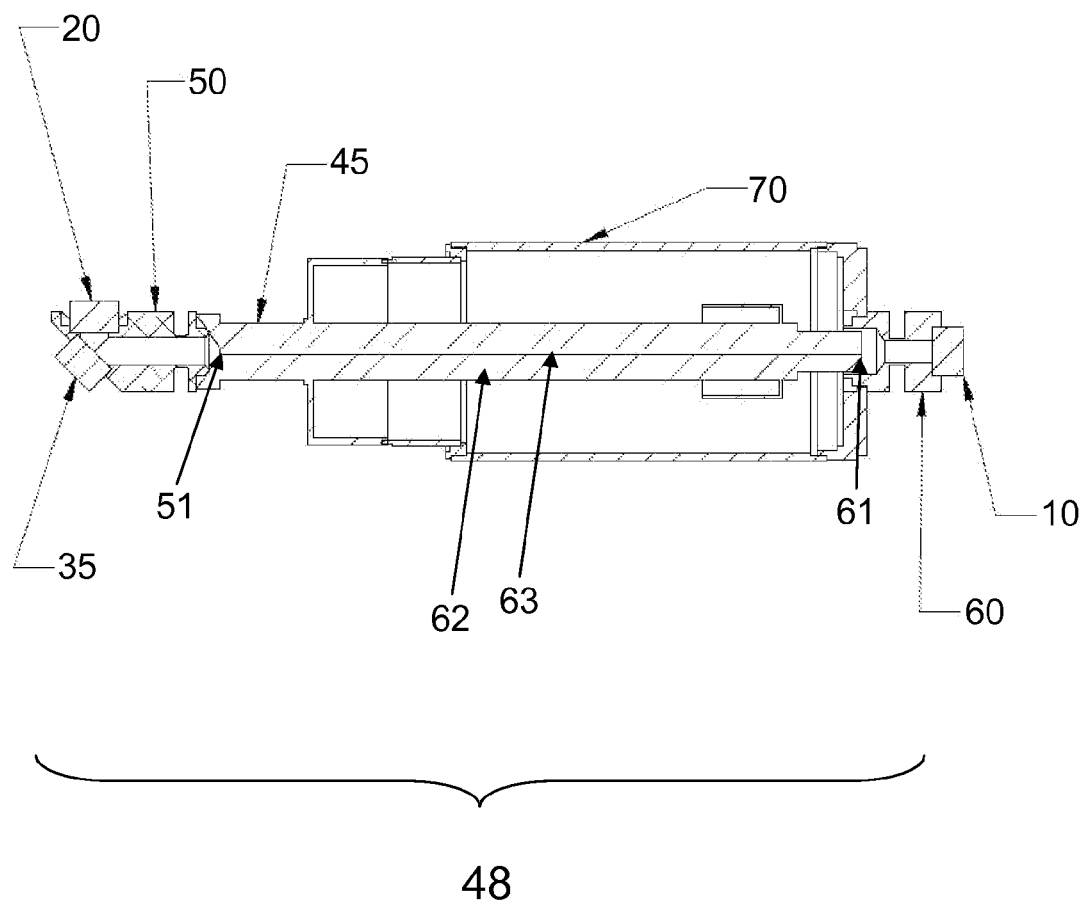
FIG. 3 provides a cross sectional view of a dual-longitudinal mode HeNe laser of the present invention providing polarization control and stabilization.

FIG. 3 provides a cross sectional view of a dual-longitudinal mode HeNe laser of the present invention providing polarization control and stabilization. Dual-longitudinal mode HeNe laser 48 comprises first mirror mount assembly 60 housing first end reflector 10, gas discharge chamber 62 and second mirror mount assembly 50 housing second end reflector 20 and intracavity reflector 35. First and second mirror mount assemblies 60 and 50 optionally include metallic or ceramic mirror mounts for holding first and second end reflectors, respectively. First end reflector 10 is an output coupler reflector and second end reflector 20 is a high reflectivity reflector. Discharge chamber 62 has a capillary bore 63, and first and second mirror mount assemblies 60 and 50 are hard sealed to first end 61 and second end 51 of the discharge chamber 62. Laser housing 70 is provided and houses first mirror mount assembly 60 and discharge chamber 62.

In a cavity in which a reflection phase difference is introduced between different longitudinal modes having different polarization states, the effective optical phase of different polarization states is different. HeNe lasers in small or zero magnetic fields tend to have linear polarization orthogonal longitudinal modes, which we can define as the usual s- and p-polarization states in the presence of some internal or external reference frame. Note that in an all-normal incidence dual-longitudinal mode HeNe laser, this designation is arbitrary and defined relative only to some external optics. In contrast, in lasers of the present invention, s- and p- have identities relative to the dual-longitudinal mode HeNe laser geometry itself. In a laser of the present invention, for example, the first longitudinal mode has a linear polarization state having a polarization plane that is oriented perpendicular to the plane of incidence of said laser electromagnetic radiation incident to said intracavity reflector and the second longitudinal mode has a linear polarization state having a polarization plane that is oriented parallel to the plane of incidence of said laser electromagnetic radiation incident to said intracavity reflector. The optical phase of the s-polarized longitudinal mode is designed to be different from that of the p-polarized longitudinal mode. This leads to a difference in cavity resonance frequency for the two longitudinal modes. This difference is detectable by measuring the rf beat-note between adjacent longitudinal modes of the laser. Adjacent longitudinal modes are orthogonally polarized with respect to one another. In cavities with no reflection phase difference between different longitudinal modes, the adjacent-longitudinal-mode beat-note is the cavity FSR.

Figure 4:
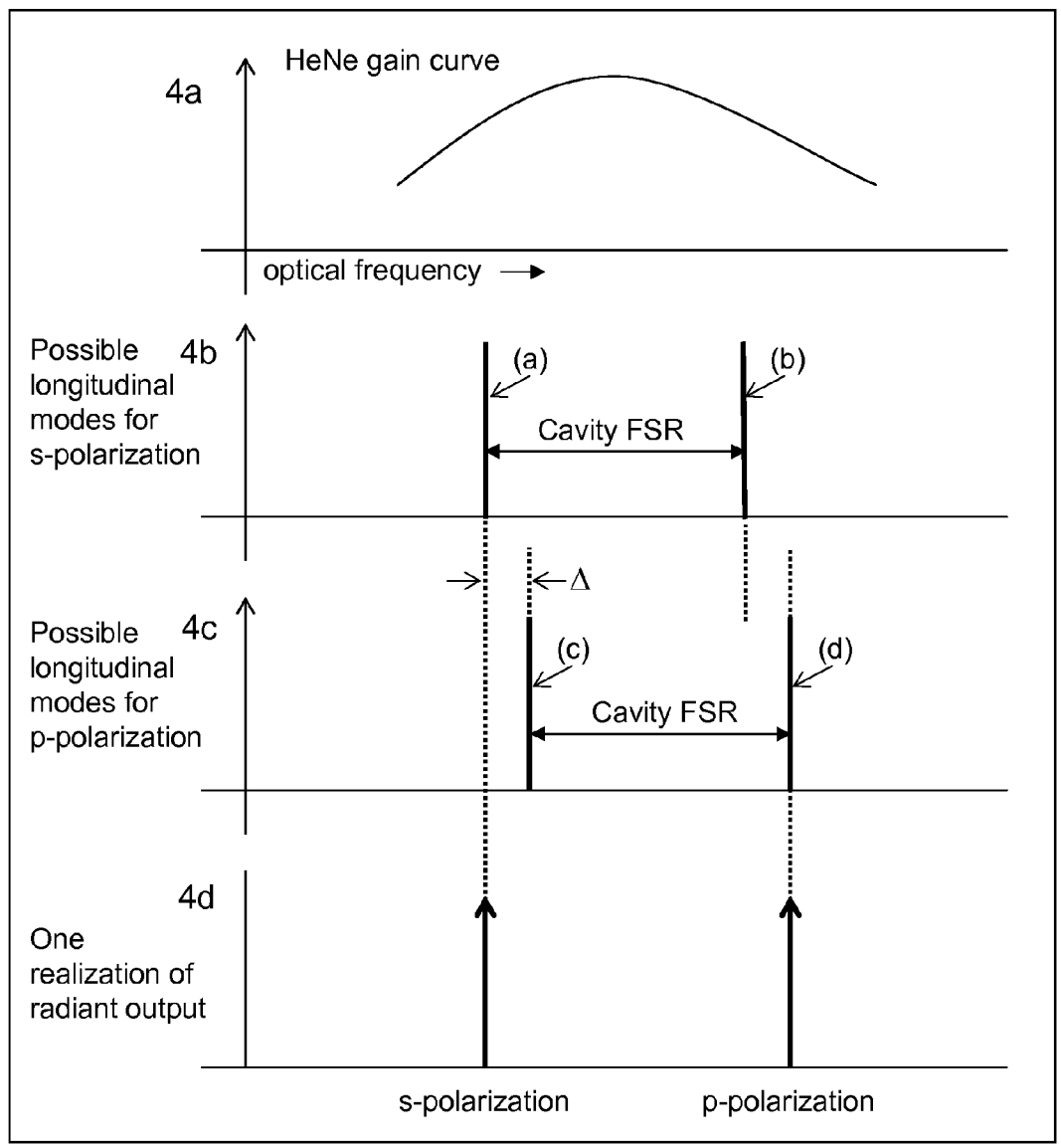
FIG. 4 provides spectra showing the HeNe gain curve, s-polarization and p-polarization longitudinal modes and the cavity free spectral range of a dual-longitudinal mode HeNe laser of the present invention.

FIG. 4 provides spectra showing the HeNe gain curve, s-polarization and p-polarization longitudinal modes and the cavity free spectral range of a dual-longitudinal mode HeNe laser of the present invention. FIG. 4a provides the HeNe gain curve. FIG. 4b provides plots of possible longitudinal modes having s-polarization states that are identified as (a) and (b). FIG. 4c provides plots of possible longitudinal modes having p-polarization states that are identified as (c) and (d). Resonant cavity free spectral ranges (FSR) are also shown in shown in FIGS. 4b and 4c for both polarization states. FIG. 4d provides plots showing one realization of radiant output. The possible longitudinal modes contributing to "long" and "short" beat-notes are also shown in FIG. 4. Note that the different peak positions for the two polarizations are exaggerated in FIG. 4 for the sake of illustration. The figure shows the possible beat-notes depending on whether a p- or s-mode is on the low frequency side of the gain curve.

The difference in frequency of the long and short beat notes is the difference in resonance position between the s- and p-modes and is, therefore, a measure of the phase retardance of the optics. The cavity resonances for s- and p-polarization occur at frequencies v which satisfy the following relationships:

$$v_{pn} = \frac{c}{2l}\left(n - \frac{\theta_p}{\pi}\right); v_{sm} = \frac{c}{2l}\left(m - \frac{\theta_s}{\pi}\right), \quad \text{(III)}$$

where l is the physical length of the cavity, c is the speed of light, m and n (=1, 2, 3 . . . ) are the mode orders (number of half-waves) of each mode and the θ are the reflection phases (in radians) at the non-normal incidence reflector for the two polarizations; subscripts s and p indicate polarization state. The expression (III) is valid for longitudinal modes under the gain curve, over which the phases $\theta_p$ and $\theta_s$ do not substantially vary.

The difference frequency between two resonances is:

$$v_{pn} - v_{sm} = \frac{c}{2l}\left(n - m - \frac{\delta}{\pi}\right) \quad \text{(IV)}$$

where δ is the difference in reflection phase between s- and p-polarization. As long as δ is small, the longitudinal mode order for s- and p-polarizations differs by one for adjacent longitudinal modes. A similar expression is derived with s- and p-polarization swapped, in which case δ is added to the longitudinal mode order difference rather than subtracted. One is the long and one is the short beat note described above (depending on the sign of δ). The long and the short beat-notes differ in frequency by:

$$\Delta = \left(\frac{2\delta}{\pi}\right) \cdot FSR.$$

where FSR=c/2l is the frequency spacing between longitudinal modes of the same polarization.

To demonstrate the polarization control and stabilization capabilities of the present invention, several dual-longitudinal mode HeNe lasers were made and characterized having the present resonant cavity design incorporating an intracavity reflector providing a nonzero reflection phase difference. Intracavity reflectors providing a nonzero reflection phase difference were provided at 45 degree angle of incidence (e.g., laser design illustrated in FIG. 1) and at 15 degree angle of incidence (e.g, laser design illustrated in FIG. 2). Properties and optical components of the HeNe lasers tested are summarized in Table 1.

TABLE 1

Properties and optical components of the HeNe lasers tested.

| Laser Design | Angle of Incidence | Reflector | Color | Design δ | Measured δ | Beat-note Δ |
|---|---|---|---|---|---|---|
| 1 | normal | ebeam | red | — | — | 2 MHz |
| 2 | 45 degrees | IBS 1 | red | 0° | 1.4° | 20 MHz |
| 3 | 45 degrees | IBS 2 | red | 20° | 20.1° | 120 MHz |
| 4 | 15 degrees | IBS 3 | red | 0.2° | — | ≈2.65 MHz |

The thin film optical coating designs of the intracavity reflectors of laser designs 2 and 3 described in Table 1 above comprise an alternating sequence of $Ta_2O_5$ and $SiO_2$ thin film layers, wherein the physical thickness of thin film layers in the sequence are selected to provide the desired reflection phase difference between first and second modes having orthogonal linear polarization states. As will be understood by those of skill in the art, reflection phase difference between longitudinal modes having orthogonal linear polarization states can be selectively adjusted using a variety of thin film design strategies including selection of the reflective index, composition and/or physical thickness of individual dielectric, semiconductor and/or metallic thin film layers comprising the intracavity reflector optical coating. In exemplary strategies, the physical and optical properties of the first 1 to about 10 layers proximate to the exposed reflective surface of the intracavity reflector are selected so as to provide the desired reflection phase difference between first and second modes having orthogonal linear polarization states. All other layers in the thin film optical coating designs were approximately quarter wave layers.

The FSR of all the lasers is approximately 1.2 GHz. The "measured δ" comes from a laser-based retardation measurement on a free mirror, prior to laser assembly. The beat-note Δ are measured on the finished lasers. The non-normal incidence reflector dual-longitudinal mode HeNe lasers all have their polarization pinned to the non-normal incidence optic axis laser and the beat-note Δ are in reasonable agreement with the independently measured reflection phase δ.

The red IBS 1 and IBS 3 (as referenced in Table 1) dual-longitudinal mode HeNe laser exhibits excellent polarization stabilization and control. The red IBS2 dual-longitudinal mode HeNe laser has a split mode when one longitudinal mode is active. The splitting is 125 MHz. This indicates that the s- and p-resonances are sufficiently far apart that there is minimal competition, so they both lase simultaneously. This regime of Δ has application in synthetic wavelength generation for applications including distance metrology.

It should be noted that many IBS dual-longitudinal mode HeNe lasers currently require magnets for proper operation. In the absence of a magnetic field (or, more accurately, in only the earth's ambient field) the dual-longitudinal mode HeNe lasers tend to stay in one polarization state (either s- or p-). That is, in the absence of an applied magnetic field, as the cavity modes drift through the gain curve, the polarization of a given longitudinal mode snaps to the orthogonal polarization state, with a characteristic flutter in intensity. Magnets near the dual-longitudinal mode HeNe laser (in certain orientations and certain strengths) fix this problem. The dual-longitudinal mode HeNe laser having e-beam deposited reflectors, with its order of magnitude smaller beat note Δ does not require an extra magnet.

A dual-longitudinal mode HeNe laser using a 15 degree angle of incidence intracavity reflector design (e.g., see laser design illustrated in FIG. 2) was as constructed and tested. This reflector was designed to have a δ=0.2 degrees at 633 nm. This laser has a beat-note Δ=2.65 MHz, right in line with the predicted value, and approximately 10 times smaller than the present 45 degree-design. This laser performs more consistently in the absence of external applied magnetic field than our 45 degree, Δ=20 MHz tubes. This is consistent with the prediction that the required magnet field is proportional to Δ. Small Δ could be achieved with the 45 degree configuration, with proper coating control.

Figure 10:
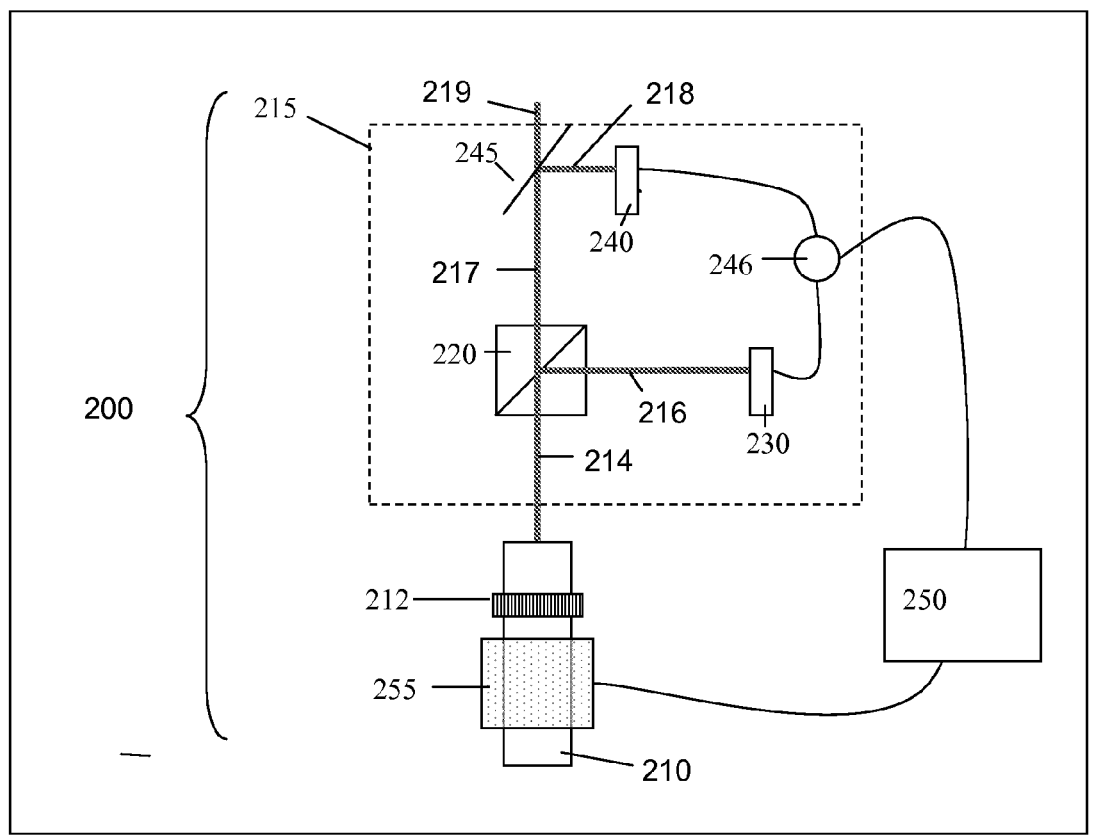
FIG. 10 shows a schematic diagram of a frequency-stabilized laser of the present invention comprising a laser source, an analyzer and a controller.

FIG. 10 shows a schematic diagram of a frequency-stabilized laser of the present invention comprising a laser source, an analyzer and a controller. Broadly, the analyzer evaluates a function of photodetector signals that depend on the resonant cavity optical path length. The controller drives a heater to change the resonant cavity optical path length in order to maintain constant the photodetector signal function. In an alternative embodiment, the controller drives one or more piezoelectric elements operationally coupled to the multi-longitudinal mode laser so as to selectively adjust the resonant cavity optical path length. The analyzer consists of a polarizing beam splitter (PBS) that separates the two laser longitudinal modes based on their polarization state, two photodetectors that measure the powers in the two longitudinal modes, and electronics that calculates a function of the two powers (typically the difference). Typically, one polarization (one longitudinal mode) is delivered as output.

Referring to FIG. 10, laser optical source 210 generates radiant output 214 comprising two orthogonal linearly polarized longitudinal modes having preselected and substantially constant angular orientations of their respective polarization planes. Optionally, fixed magnet 212 is operationally coupled to laser source 210 such that it is capable of generating an applied magnetic field to the gain medium of the laser. Radiant output 214 from laser 210 is provided to analyzer 215 comprising polarizing beam splitter 220, first photodetector 230, second photodetector 240 and beam splitter 245. Radiant output 214 is directed on to polarizing beam splitter 220 that separates the incident beam into the two spatially separated beams: (i) a first beam having a first linear polarization state 216 (e.g., s-polarization) and (ii) a second beam having a second polarization state 217 (e.g., p-polarization). As shown in the figure, the first beam 216 is detected by first photodetector 230. Second beam 217 is directed to beam splitter 245 which separates it into an output beam 219 and a beam 218 which is detected by second photodetector 240. Output signals are generated by first and second photodetectors corresponding to radiant powers of beams 216 and 218, respectively, and are provided to signal analyzer 246, which determines a preselected photodetector signal function of the two radiant powers, for example the difference of the radiant powers of beams 216 and 218. Signal analyzer 246 provides an output signal to controller 250 that selectively adjust the resonant cavity optical path length of laser 210 so as to frequency stabilize the lasers. In the embodiment shown in FIG. 10, controller 250 controls the resonant cavity optical path length of laser 210 thermally via controlling heater 255 operationally coupled to laser 210. Controller 250 can control the resonant cavity optical path length of laser 210 via means other than thermal means, for example by driving one or more piezoelectric device components (not shown in FIG. 10) capable of selectively adjust the resonant cavity optical path length of laser 210.

In an embodiment, controller 250 is capable of providing feedback control of the resonant cavity optical path length of laser 210 on the basis of the output signals from first and second photodetectors, wherein the preselected photodetector signal function of the two radiant powers is established and maintained at a constant value.

Example 1

Allan Deviation Characterization of Dual-Longitudinal Mode HeNe Lasers

Figure 5:
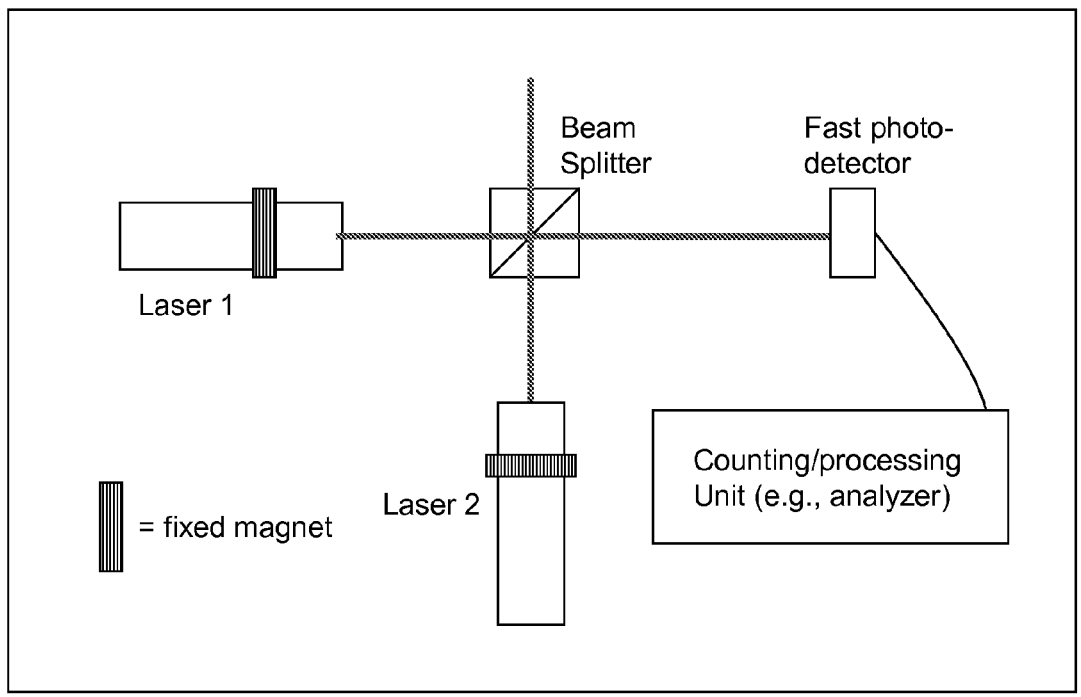
FIG. 5 provides a schematic diagram showing the experimental setup for the Allan deviation characterization experiments.

We have constructed two locked laser systems using the 45 degree mount tubes in housings (laser design 2 in Table 1 and see optical configuration in FIG. 1) which work well with a small (greater than a few Gauss) applied magnetic field. FIG. 5 provides a schematic diagram showing the experimental setup for the Allan deviation characterization experiments.

Allan Deviation Measurements dual-Ion (dual-longitudinal mode HeNe vs $I_2$-stabilized—The stability of one of the present dual-longitudinal mode HeNe lasers was measured against an Iodine-stabilized HeNe laser.

Figure 6:
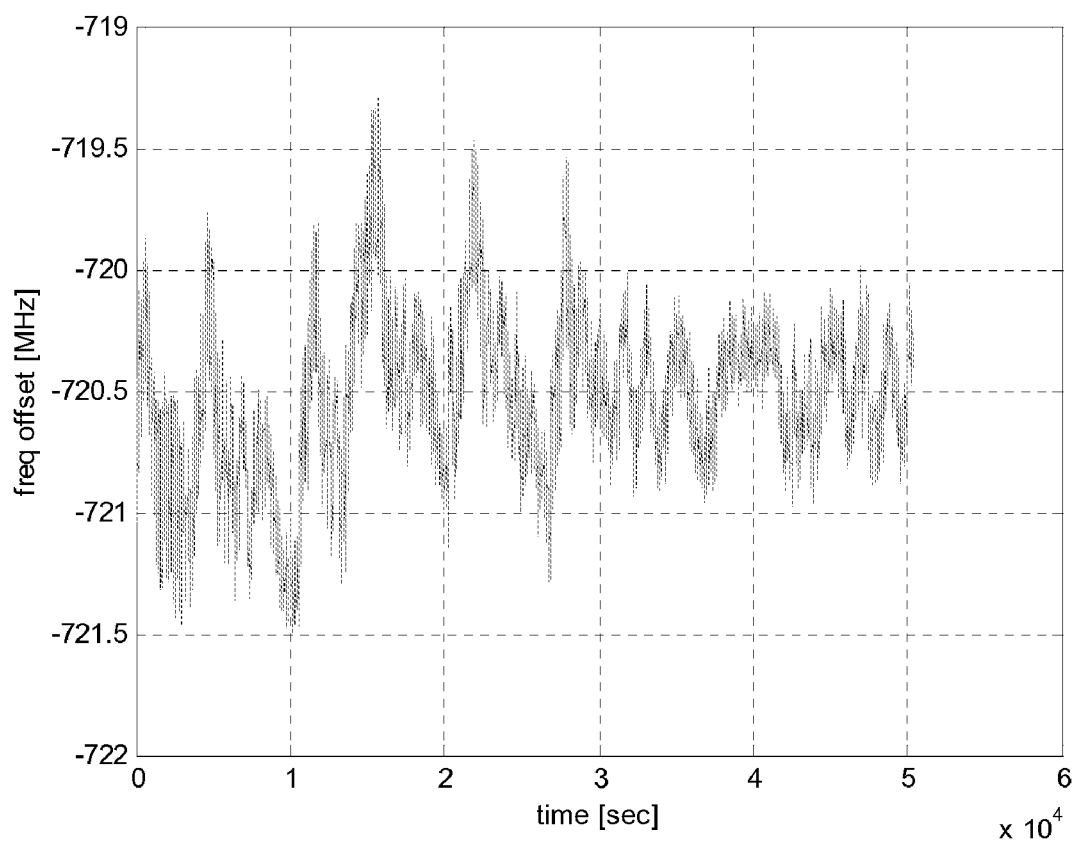
FIG. 6 provides a plot of frequency offset versus time for a dual-longitudinal mode HeNe laser of the present invention.

FIG. 6 provides a plot of frequency offset versus time for a dual-longitudinal mode HeNe laser of the present invention. In FIG. 6 frequency offset is measured with respect to an iodine stabilized laser.

Figure 7:
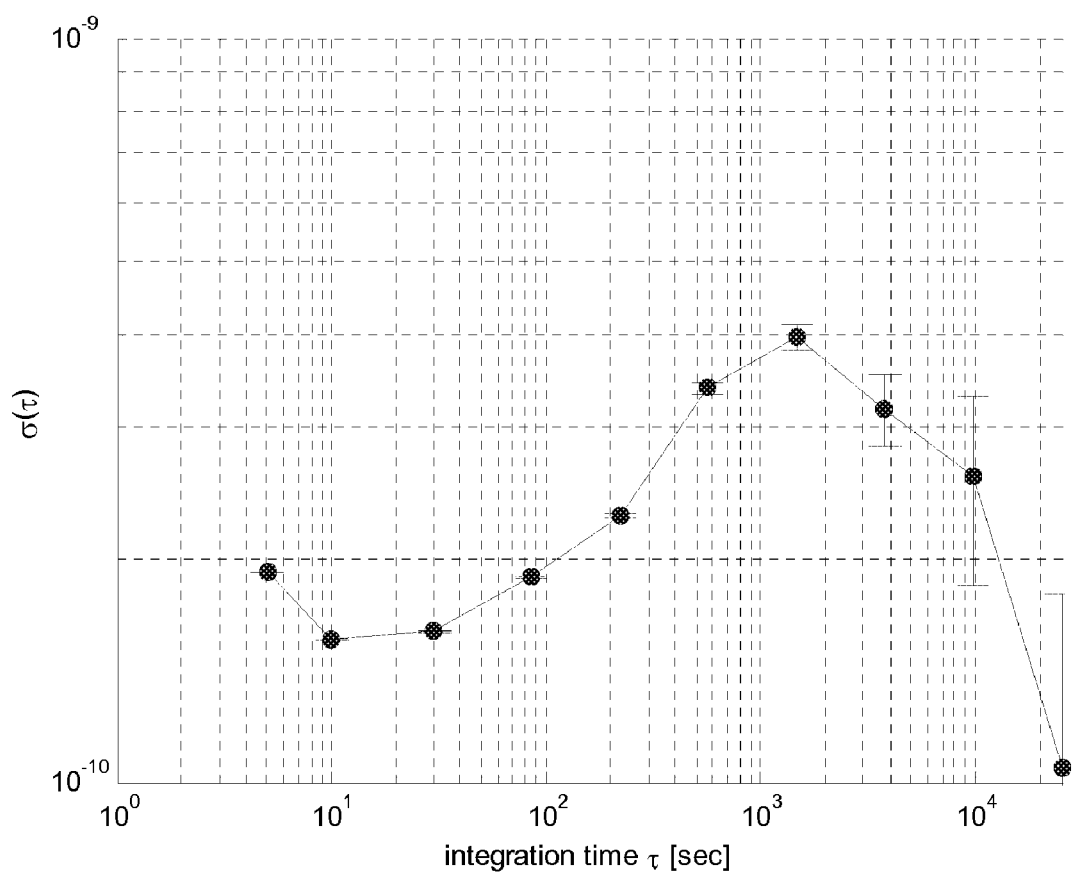
FIG. 7 provides a plot of $\sigma(\tau)$ versus integration time $\tau$ (seconds) time for a dual-longitudinal mode HeNe laser of the present invention.

FIG. 7 is a plot of the frequency stability of the laser, relative to an iodine-stabilized HeNe laser. The vertical axis is the Allan deviation $\sigma(\tau)$, the horizontal axis is the averaging time ($\tau$). The Allan deviation is a statistic that is used to estimate stability.

$$\sigma_y(\tau) = \sqrt{\frac{1}{2(M-1)} \sum_{i=1}^{M-1} (y_{i+1} - y_i)^2}$$

where $y_i$ is a set of relative fractional frequency measurements. M is the number of values in the $y_i$ series. The data are uniformly spaced in time, each having been measured over a time interval $\tau$ seconds long. Further details relating to making and interpreting Allan measurements are discussed in "Statistics of Atomic Frequency Standards", Allan, D. W., Proc. IEEE, 54, No. 2, pp. 221-230 (February 1966).

FIGS. 6 and 7 demonstrate that polarization stabilized lasers of the present invention are capable of effective frequency stabilization.

Temperature Dependence of Laser Frequency—

Figure 8:
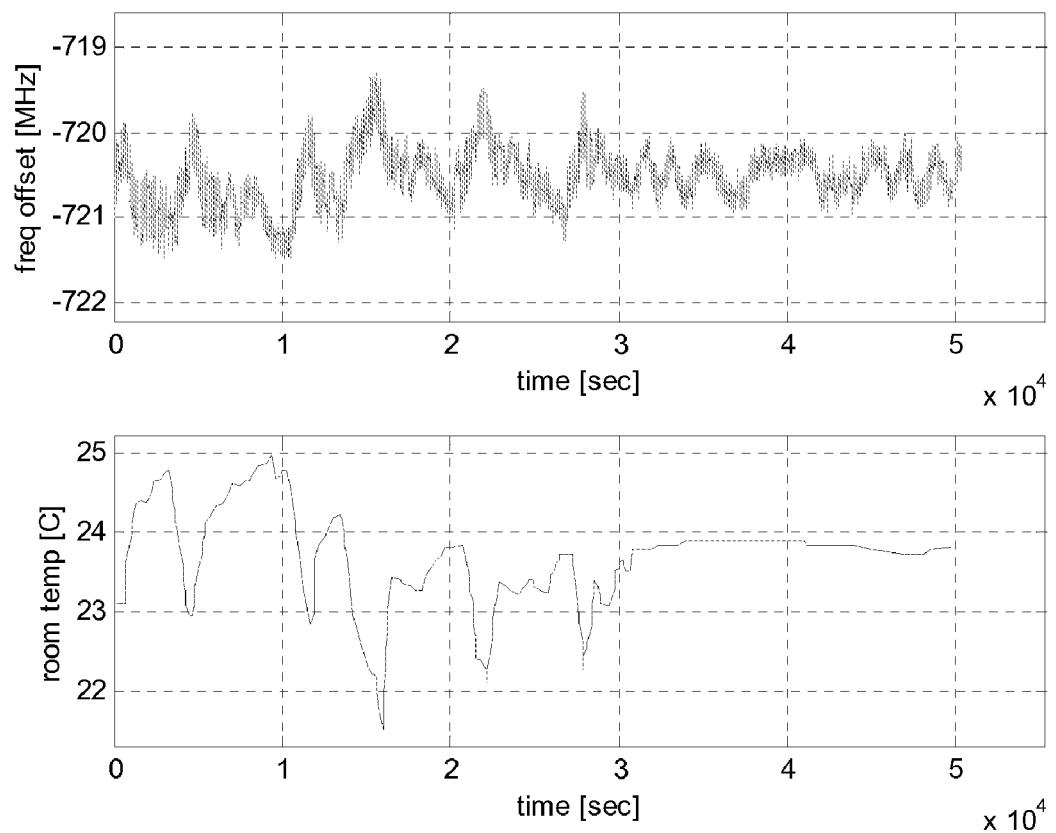
FIG. 8 provides plots of frequency offset as a function of time and corresponding temperature as a function of time for a dual-longitudinal mode HeNe laser of the present invention.

FIG. 8 provides plots of measured frequency offset as a function of time and corresponding temperature as a function of time for a dual-longitudinal mode HeNe laser of the present invention. The plots in FIG. 8 demonstrate that the frequencies of radiant output of polarization stabilized lasers of the present invention are substantially constant for temperature fluctuations of several degrees Celsius.

We also determined an approximate temperature dependence of 1 MHz/degree C. from the measurements.

Example 2

Frequency Stabilized Dual-Longitudinal Mode HeNe Lasers

It is a goal of certain aspects of the present invention to provide multi-longitudinal mode lasers and resonant cavity configurations for generating radiant output having highly stable and precisely controlled optical characteristics, such as polarization states and frequencies. To demonstrate this capability of the present invention, frequencies were measured of the radiant output of a mode locked laser system having an intracavity reflector positioned such that the laser electromagnetic radiation is incident upon the intracavity reflector at a non-normal angle of incidence. The optical geometry of the laser system corresponds to laser design 2 shown in Table 1 and has a resonant cavity optical geometry as shown in FIG. 1. The intracavity reflector has a thin film coating comprising an alternating sequence of $Ta_2O_5$ and $SiO_2$ thin film layers, wherein the physical thickness of thin film layers in the sequence are selected to provide the specified reflection phase difference between first and second modes. Although two modes were used for mode locking, the radiant output comprised a single longitudinal mode having a power equal to approximately 1.5 mW. The free spectral range of the radiant output is equal to 630 MHz.

Figure 11:
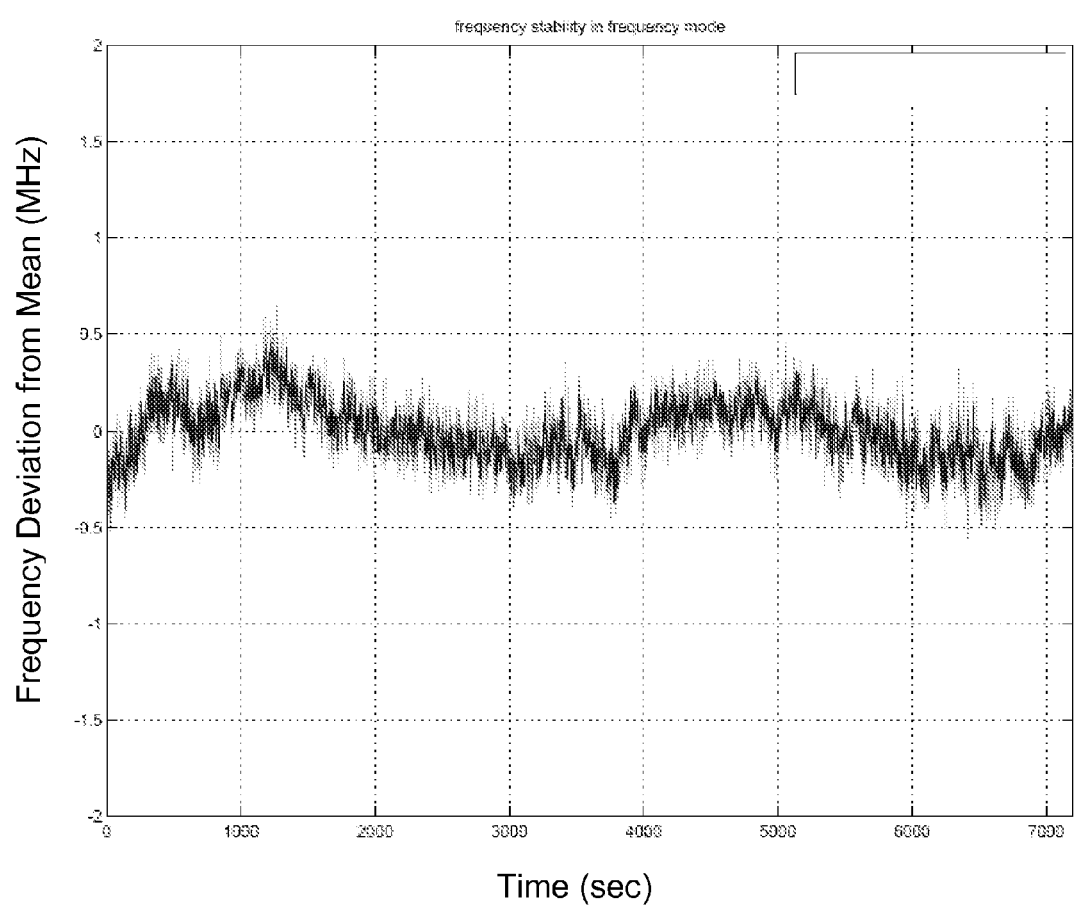
FIG. 11 provides a plot of the frequency deviation from the mean frequency of the radiant output (MHz) versus time (seconds) for the mode locked laser system of Example 2.

FIG. 11 provides a plot of the frequency deviation from the mean frequency of the radiant output (MHz) versus time (seconds) for the mode locked laser system of this Example. As shown in FIG. 11, the radiant output of this laser system is highly stable for long time intervals with deviations from the mean frequency equal to or less than about 0.5 MHz. FIG. 11 demonstrates that polarization stabilized lasers of the present invention are capable of effective frequency stabilization via mode locking.

STATEMENTS REGARDING INCORPORATION BY REFERENCE AND VARIATIONS

All references throughout this application, for example patent documents including issued or granted patents or equivalents; patent application publications; unpublished patent applications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Any appendix or appendices hereto are incorporated by reference as part of the specification and/or drawings.

Where the terms "comprise", "comprises", "comprised", or "comprising" are used herein, they are to be interpreted as specifying the presence of the stated features, integers, steps, or components referred to, but not to preclude the presence or addition of one or more other feature, integer, step, component, or group thereof. Separate embodiments of the invention are also intended to be encompassed wherein the terms "comprising" or "comprise(s)" or "comprised" are optionally replaced with the terms, analogous in grammar, e.g.; "consisting/consist(s)" or "consisting essentially of/consist(s) essentially of" to thereby describe further embodiments that are not necessarily coextensive.

The invention has been described with reference to various specific and preferred embodiments and techniques. However, it should be understood that many variations and modifications may be made while remaining within the spirit and scope of the invention. It will be apparent to one of ordinary skill in the art that compositions, methods, devices, device elements, materials, procedures and techniques other than those specifically described herein can be applied to the practice of the invention as broadly disclosed herein without resort to undue experimentation. All art-known functional equivalents of compositions, methods, devices, device elements, materials, procedures and techniques described herein are intended to be encompassed by this invention. Whenever a range is disclosed, all subranges and individual values are intended to be encompassed as if separately set forth. This invention is not to be limited by the embodiments disclosed, including any shown in the drawings or exemplified in the specification, which are given by way of example or illustration and not of limitation. The scope of the invention shall be limited only by the claims.

We claim:

1. A multi-longitudinal mode laser, comprising:
    an optical resonant cavity comprising first and second end reflectors provided in optical communication with each other, wherein said first and second end reflectors are spaced apart by a resonant cavity optical path having an optical path length selected so as to allow first and second longitudinal modes of laser electromagnetic radiation upon excitation of a gain medium provided in said resonant cavity optical path between said first and second end reflectors; and
    an intracavity reflector positioned in said resonant cavity such that said laser electromagnetic radiation is incident upon said intracavity reflector at a non-normal angle of incidence, said intracavity reflector providing a first reflection phase shift for said first longitudinal mode of laser electromagnetic radiation and providing a second reflection phase shift for said second longitudinal mode of laser electromagnetic radiation, wherein said first reflection phase shift is different than said second reflection phase shift, wherein said intracavity reflector provides a selected reflection phase difference between said first and second longitudinal modes of laser electromagnetic radiation, and wherein said selected reflection phase difference between said first and second longitudinal modes of laser electromagnetic radiation is selected from the range of about 0.1 degrees to about 20 degrees.

2. The laser of claim 1 wherein said first and second longitudinal modes have different polarization states.

3. The laser of claim 1 wherein said first and second longitudinal modes have linear polarization states that are oriented orthogonal to each other.

4. The laser of claim 1 wherein said first longitudinal mode has a linear polarization state having a polarization plane that is oriented perpendicular to the plane of incidence of said laser electromagnetic radiation incident to said intracavity reflector, and wherein said second longitudinal mode has a linear polarization state having a polarization plane that is oriented parallel to the plane of incidence of said laser electromagnetic radiation incident to said intracavity reflector.

5. The laser of claim 1 wherein said selected reflection phase difference between said first and second longitudinal modes of laser electromagnetic radiation is selected from the range of about 0.1 degrees to about 5 degrees.

6. The laser of claim 1 wherein said intracavity reflector is oriented in said resonant cavity such that said laser electromagnetic radiation is incident upon said intracavity reflector at an angle of incidence providing said selected reflection phase difference between said first and second longitudinal modes of laser electromagnetic radiation.

7. The laser of claim 6 wherein said intracavity reflector is oriented in said resonant cavity such that said laser electromagnetic radiation is incident upon said intracavity reflector at a non-normal angle of incidence less than or equal to about 15 degrees.

8. The laser of claim 1 further comprising one or more magnets positioned so as to generate an applied magnetic field to at least a portion of the gain medium.

9. The laser of claim 1 wherein said intracavity reflector comprises a thin film optical coating.

10. The laser of claim 9 wherein said thin film optical coating comprises a sequence of thin film layers, wherein said sequence comprises alternating high and low indices of refraction layers, wherein thicknesses, refractive indices or both of at least a portion of said layers are selected to provide said selected reflection phase difference between said first and second longitudinal modes.

11. The laser of claim 1 wherein said intracavity reflector provides substantially the same reflectivities of said first and second longitudinal modes of laser electromagnetic radiation, wherein said first and second longitudinal modes of laser electromagnetic radiation have orthogonal linear polarization states.

12. The laser of claim 1 wherein said intracavity reflector provides reflectivities of said first and second longitudinal modes of laser electromagnetic radiation that are greater than or equal to 99%.

13. The laser of claim 1 wherein said intracavity reflector comprises a sequence of thin dielectric or semiconductor layers deposited on a substrate via ion beam sputtering.

14. The laser of claim 1 wherein only said first and second longitudinal modes of laser electromagnetic radiation are generated upon excitation of said gain medium.

15. The laser of claim 14 wherein the resonant cavity optical path length, the composition of the gain medium, the reflectivities of the end reflectors or any combination of these are selected such that only said first and second longitudinal modes of laser electromagnetic radiation are generated upon excitation of said gain medium.

16. The laser of claim 1 wherein said gain medium is a mixture of helium and neon gases and said resonant cavity optical path length is selected over the range of about 10 cm to about 30 cm.

17. The laser of claim 1 wherein the laser provides a radiant output comprising said first and second longitudinal modes of laser electromagnetic radiation having orthogonal linear polarization states.

18. The laser of claim 1 wherein the laser provides a radiant output comprising said first and second longitudinal modes of laser electromagnetic radiation, wherein said first and second longitudinal modes correspond to s- and p-linear polarization states with respect to an incident plane of said laser electromagnetic radiation incident to said intracavity reflector.

19. The laser of claim 1 wherein the laser provides a radiant output comprising said first and second longitudinal modes having different linear polarization states, said first and second longitudinal modes having angular orientations of their polarization planes that are substantially constant.

20. The laser of claim 19 wherein said laser is provided within a mechanical housing, wherein said substantially constant angular orientations of said polarization planes are selected relative to the orientation of the mechanical housing of said laser.

21. The laser of claim 1 wherein the laser is a gas phase laser.

22. The laser of claim 1 wherein the laser is a HeNe laser.

23. The laser of claim 1 wherein the laser provides a radiant output in the visible region of the electromagnetic spectrum.

24. A frequency stabilized laser comprising:
the multi-longitudinal mode laser of claim 1 for generating a radiant output comprising said first and second longitudinal modes of laser electromagnetic radiation having orthogonal linear polarization states, wherein said first and second longitudinal modes have angular orientations of their polarization planes that are substantially constant;
an analyzer for determining a preselected photodetector signal function of a radiant power of said first longitudinal mode and a radiant power of said second longitudinal mode, said analyzer providing output signals to a controller; and
the controller for receiving said output signals and for selectively adjusting the resonant cavity optical path length such that said preselected photodetector signal function of the radiant powers of first and second longitudinal modes is equal to a predetermined value.

25. The frequency stabilized laser of claim 24 wherein said analyzer comprises:
a polarizer for spatially separating said first longitudinal mode from said second longitudinal mode;
a first photodetector for measuring radiant intensities of said first longitudinal mode and generating a first photodetector output signal;
a second photodetector for measuring radiant intensities of said second longitudinal mode and generating a second photodetector output signal; and
a signal analyzer for receiving said first and second photodetector output signals for determining said signal function of the radiant power of said first longitudinal mode and the radiant power of said second longitudinal mode.

26. The frequency stabilized laser of claim 24 wherein said controller comprises a temperature controller or a piezoelectric element operationally connected to said laser and capable of changing the optical path length of said optical resonant cavity.

27. The frequency stabilized laser of claim 24 wherein said analyzer provides feedback control of said resonant cavity optical path length so as to establish and maintain said signal function of the radiant power of said first longitudinal mode and the radiant power of said second longitudinal mode at said preselected value.

28. A method of frequency stabilizing the radiant output of a multi-longitudinal mode laser, said method comprising the steps of:
providing said multi-longitudinal mode laser of claim 1, wherein said multi-longitudinal mode laser generates a radiant output comprising said first and second longitudinal modes of laser electromagnetic radiation having orthogonal linear polarization states, wherein said first and second longitudinal modes have angular orientations of their polarization planes that are substantially constant;

separating said first longitudinal mode from said second longitudinal mode;

measuring radiant powers of said first longitudinal mode;

measuring radiant powers of said second longitudinal mode; and controlling said resonant cavity optical path length such that a preselected photodetector signal function of the radiant powers of said first and second longitudinal modes is equal to a predetermined value.

29. The laser of claim 1 wherein said intracavity reflector is oriented in said resonant cavity such that said laser electromagnetic radiation is incident upon said intracavity reflector at a non-normal angle of incidence equal to 45 degrees or 15 degrees.

30. A method for controlling angular orientations of the polarization planes of radiant output of a multi-longitudinal mode laser, said method comprising the steps of:

providing an optical resonant cavity comprising first and second end reflectors provided in optical communication with each other, wherein said first and second reflectors are spaced apart by a resonant cavity optical path length selected so as to allow first and second longitudinal modes of laser electromagnetic radiation upon excitation of a gain medium provided between said first and second end reflectors; and providing an intracavity reflection of said laser electromagnetic radiation at non-normal incidence, said intracavity reflection providing a first reflection phase shift for said first longitudinal mode of laser electromagnetic radiation and providing a second reflection phase shift for said second longitudinal mode of laser electromagnetic radiation, wherein said first phase shift is different than said second reflection phase shift; wherein said intracavity reflection provides a selected reflection phase difference between said first and second longitudinal modes of laser electromagnetic radiation, and wherein said selected reflection phase difference between said first and second longitudinal modes of laser electromagnetic radiation is selected from the range of about 0.1 degrees to about 20 degrees; thereby controlling the angular orientations of the polarization planes of radiant output of said multi-longitudinal mode laser.

31. A reflector assembly for a frequency stabilized multi-longitudinal mode laser comprising:

a first end reflector;

a second end reflector positioned in optical communication with said first end reflector, wherein said first and second end reflectors are spaced apart by a resonant cavity having an optical path length selected so as to allow first and second longitudinal modes of laser electromagnetic radiation upon excitation of a gain medium provided between said first and second end reflectors; and an intracavity reflector positioned in said resonant cavity such that said laser electromagnetic radiation is incident upon said intracavity reflector at a non-normal angle of incidence, said intracavity reflector providing a first reflection phase shift for said first longitudinal mode of laser electromagnetic radiation and providing a second reflection phase shift for said second longitudinal mode of laser electromagnetic radiation, wherein said first reflection phase shift is different than said second reflection phase shift; and wherein said intracavity reflector provides a selected reflection phase difference between said first and second longitudinal modes of laser electromagnetic radiation, and wherein said selected reflection phase difference between said first and second longitudinal modes of laser electromagnetic radiation is selected from the range of about 0.1 degrees to about 20 degrees.

32. A multi-longitudinal mode laser, comprising:

an optical resonant cavity comprising first and second end reflectors provided in optical communication with each other, wherein said first and second end reflectors are spaced apart by a resonant cavity optical path having an optical path length selected so as to allow first and second longitudinal modes of laser electromagnetic radiation upon excitation of a gain medium provided in said resonant cavity optical path between said first and second end reflectors; and an intracavity reflector positioned in said resonant cavity such that said laser electromagnetic radiation is incident upon said intracavity reflector at a non-normal angle of incidence, said intracavity reflector providing a first reflection phase shift for said first longitudinal mode of laser electromagnetic radiation and providing a second reflection phase shift for said second longitudinal mode of laser electromagnetic radiation, wherein said first reflection phase shift is different than said second reflection phase shift, wherein said intracavity reflector provides a selected reflection phase difference between said first and second longitudinal modes of laser electromagnetic radiation, and wherein said selected reflection phase difference between said first and second longitudinal modes of laser electromagnetic radiation is selected from the range of about 0.1 degrees to about 20 degrees, and wherein said intracavity reflector is oriented in said resonant cavity such that said laser electromagnetic radiation is incident upon said intracavity reflector at an angle of incidence providing said selected reflection phase difference between said first and second longitudinal modes of laser electromagnetic radiation, and wherein said intracavity reflector is oriented in said resonant cavity such that said laser electromagnetic radiation is incident upon said intracavity reflector at a non-normal angle of incidence less than or equal to about 15 degrees.

33. A multi-longitudinal mode laser, comprising:

an optical resonant cavity comprising first and second end reflectors provided in optical communication with each other, wherein said first and second end reflectors are spaced apart by a resonant cavity optical path having an optical path length selected so as to allow first and second longitudinal modes of laser electromagnetic radiation upon excitation of a gain medium provided in said resonant cavity optical path between said first and second end reflectors; and an intracavity reflector positioned in said resonant cavity such that said laser electromagnetic radiation is incident upon said intracavity reflector at a non-normal angle of incidence, said intracavity reflector providing a first reflection phase shift for said first longitudinal mode of laser electromagnetic radiation and providing a second reflection phase shift for said second longitudinal mode of laser electromagnetic radiation, wherein said first reflection phase shift is different than said second reflection phase shift; wherein said intracavity reflector provides a selected reflection phase difference between said first and second longitudinal modes of laser electromagnetic radiation, and wherein said selected reflection phase difference between said first and second longitudinal modes of laser electromagnetic radiation is selected from the range of about 0.1 degrees to about 20 degrees; and one or more magnets positioned so as to generate an applied magnetic field to at least a portion of said gain medium.

34. A multi-longitudinal mode laser, comprising:

an optical resonant cavity comprising first and second end reflectors provided in optical communication with each other, wherein said first and second end reflectors are spaced apart by a resonant cavity optical path having an optical path length selected so as to allow first and second longitudinal modes of laser electromagnetic radiation upon excitation of a gain medium provided in said resonant cavity optical path between said first and second end reflectors; and an intracavity reflector positioned in said resonant cavity such that said laser electromagnetic radiation is incident upon said intracavity reflector at a non-normal angle of incidence, said intracavity reflector providing a first reflection phase shift for said first longitudinal mode of laser electromagnetic radiation and providing a second reflection phase shift for said second longitudinal mode of laser electromagnetic radiation, wherein said first reflection phase shift is different than said second reflection phase shift, and wherein said intracavity reflector provides reflectivities of each of said first and second longitudinal modes of laser electromagnetic radiation that are greater than or equal to 99%, wherein said intracavity reflector provides a selected reflection phase difference between said first and second longitudinal modes of laser electromagnetic radiation, and wherein said selected reflection phase difference between said first and second longitudinal modes of laser electromagnetic radiation is selected from the range of about 0.1 degrees to about 20 degrees.

35. The laser of claim 34, wherein said first and second longitudinal modes have different polarization states.

36. The laser of claim 34, wherein said first and second longitudinal modes have linear polarization states that are oriented orthogonal to each other.

37. The laser of claim 34, wherein said first longitudinal mode has a linear polarization state having a polarization plane that is oriented perpendicular to the plane of incidence of said laser electromagnetic radiation incident to said intracavity reflector, and wherein said second longitudinal mode has a linear polarization state having a polarization plane that is oriented parallel to the plane of incidence of said laser electromagnetic radiation incident to said intracavity reflector.

38. The laser of claim 35, wherein said selected reflection phase difference between said first and second longitudinal modes of laser electromagnetic radiation is selected from the range of about 0.1 degrees to about 5 degrees.

39. The laser of claim 34, wherein said intracavity reflector is oriented in said resonant cavity such that said laser electromagnetic radiation is incident upon said intracavity reflector at an angle of incidence providing said selected reflection phase difference between said first and second longitudinal modes of laser electromagnetic radiation.

40. The laser of claim 39 wherein said intracavity reflector is oriented in said resonant cavity such that said laser electromagnetic radiation is incident upon said intracavity reflector at a non-normal angle of incidence less than or equal to about 15 degrees.

41. The laser of claim 34 further comprising one or more magnets positioned so as to generate an applied magnetic field to at least a portion of the gain medium.

42. The laser of claim 34 wherein said intracavity reflector comprises a thin film optical coating.

43. The laser of claim 42 wherein said thin film optical coating comprises a sequence of thin film layers, wherein said sequence comprises alternating high and low indices of refraction layers, wherein thicknesses, refractive indices or both of at least a portion of said layers are selected to provide said selected reflection phase difference between said first and second longitudinal modes.

44. The laser of claim 34 wherein said intracavity reflector provides substantially the same reflectivities of said first and second longitudinal modes of laser electromagnetic radiation, wherein said first and second longitudinal modes of laser electromagnetic radiation have orthogonal linear polarization states.

45. The laser of claim 34 wherein said intracavity reflector provides reflectivities of said first and second longitudinal modes of laser electromagnetic radiation that are greater than or equal to 99.9%.

46. The laser of claim 34 wherein said intracavity reflector comprises a sequence of thin dielectric or semiconductor layers deposited on a substrate via ion beam sputtering.

47. The laser of claim 34 wherein only said first and second longitudinal modes of laser electromagnetic radiation are generated upon excitation of said gain medium.

48. The laser of claim 47 wherein the resonant cavity optical path length, the composition of the gain medium, the reflectivities of the end reflectors or any combination of these are selected such that only said first and second longitudinal modes of laser electromagnetic radiation are generated upon excitation of said gain medium.

49. The laser of claim 34 wherein said gain medium is a mixture of helium and neon gases and said resonant cavity optical path length is selected over the range of about 10 cm to about 30 cm.

50. The laser of claim 34 wherein the laser provides a radiant output comprising said first and second longitudinal modes of laser electromagnetic radiation having orthogonal linear polarization states.

51. The laser of claim 34 wherein the laser provides a radiant output comprising said first and second longitudinal modes of laser electromagnetic radiation, wherein said first and second longitudinal modes correspond to s- and p-linear polarization states with respect to an incident plane of said laser electromagnetic radiation incident to said intracavity reflector.

52. The laser of claim 34 wherein the laser provides a radiant output comprising said first and second longitudinal modes having different linear polarization states, said first and second longitudinal modes having angular orientations of their polarization planes that are substantially constant.

53. The laser of claim 52 wherein said laser is provided within a mechanical housing, wherein said substantially constant angular orientations of said polarization planes are selected relative to the orientation of the mechanical housing of said laser.

54. The laser of claim 34 wherein the laser is a gas phase laser.

55. The laser of claim 34 wherein the laser is a HeNe laser.

56. The laser of claim 34 wherein the laser provides a radiant output in the visible region of the electromagnetic spectrum.

57. The laser of claim 34 wherein said intracavity reflector is oriented in said resonant cavity such that said laser electromagnetic radiation is incident upon said intracavity reflector at a non-normal angle of incidence equal to 45 degrees or 15 degrees.

* * * * *